US008991181B2

(12) United States Patent
Palmer

(10) Patent No.: US 8,991,181 B2
(45) Date of Patent: Mar. 31, 2015

(54) HYBRID IMBEDDED COMBINED CYCLE

(75) Inventor: William R. Palmer, Melbourne, FL (US)

(73) Assignee: Harris Corporation, Melbourne, FL (US)

(*) Notice: Subject to any disclaimer, the term of this patent is extended or adjusted under 35 U.S.C. 154(b) by 465 days.

(21) Appl. No.: 13/098,603

(22) Filed: May 2, 2011

(65) Prior Publication Data
US 2012/0279220 A1    Nov. 8, 2012

(51) Int. Cl.
F01K 25/06    (2006.01)

(52) U.S. Cl.
CPC . *F01K 25/06* (2013.01); *Y02E 20/16* (2013.01)
USPC .......................................................... 60/641.2

(58) Field of Classification Search
USPC ................................. 60/641.2, 645, 649, 670
See application file for complete search history.

(56) References Cited

U.S. PATENT DOCUMENTS

| | | | |
|---|---|---|---|
| 3,007,306 A | | 11/1961 | Martin et al. |
| 3,636,706 A | | 1/1972 | Minto |
| 3,935,710 A | * | 2/1976 | Dickinson ....................... 60/657 |
| 4,009,587 A | | 3/1977 | Robinson, Jr. et al. |
| 4,106,294 A | * | 8/1978 | Czaja .............................. 60/649 |
| 4,196,594 A | * | 4/1980 | Abom ............................. 60/649 |
| 4,283,211 A | * | 8/1981 | Ehrlich et al. ...................... 62/4 |
| 4,291,538 A | * | 9/1981 | Husain et al. .................... 60/661 |
| 4,366,675 A | * | 1/1983 | Nishioka ......................... 60/693 |
| 4,484,446 A | | 11/1984 | Goldsberry |
| 4,548,043 A | * | 10/1985 | Kalina ............................ 60/673 |
| 4,660,511 A | | 4/1987 | Anderson |
| 4,876,855 A | * | 10/1989 | Yogev et al. ..................... 60/651 |
| 4,926,643 A | * | 5/1990 | Johnston ......................... 60/691 |
| 5,137,681 A | | 8/1992 | Dougherty |
| 5,268,942 A | * | 12/1993 | Newton et al. ................. 376/272 |

(Continued)

FOREIGN PATENT DOCUMENTS

| | | |
|---|---|---|
| DE | 3327838 A1 | 12/1983 |
| DE | 198 04 845 A1 | 8/1999 |

(Continued)

OTHER PUBLICATIONS

English Translation of JP 2000282810 A (machine translation).*

(Continued)

*Primary Examiner* — Thomas Denion
*Assistant Examiner* — Shafiq Mian
(74) *Attorney, Agent, or Firm* — Robert J. Sacco, Esq.; Fox Rothschild LLP

(57) ABSTRACT

A method (400, 1100) and apparatus (500, 1200) for producing work from heat includes a boiler (510) which is configured for heating a pressurized flow of a first working fluid ($F_1$) to form of a first vapor. A compressor (502) compresses a second working fluid ($F_2$) in the form of a second vapor. A mixing chamber (504) receives the first and second vapor and transfers thermal energy directly from the first vapor to the second vapor. The thermal energy that is transferred from the first vapor to the second vapor will generally include at least a portion of a latent heat of vaporization of the first working fluid. An expander (506) is arranged to expand a mixture of the first and second vapor received from the mixing chamber, thereby performing useful work after or during the transferring operation. The process is closed and enables recirculation and therefore recycling of thermal energy that is normally unused in conventional cycle approaches.

13 Claims, 17 Drawing Sheets

(56) References Cited

U.S. PATENT DOCUMENTS

| | | | |
|---|---|---|---|
| 5,444,981 A * | 8/1995 | Kakovitch | 60/649 |
| 5,644,911 A * | 7/1997 | Huber | 60/775 |
| 6,032,467 A * | 3/2000 | Oshita et al. | 60/651 |
| 6,145,295 A | 11/2000 | Donovan et al. | |
| 6,250,105 B1 * | 6/2001 | Kimble | 62/613 |
| 6,413,484 B1 | 7/2002 | Koch | |
| 6,769,256 B1 | 8/2004 | Kalina | |
| 7,010,920 B2 * | 3/2006 | Saranchuk et al. | 60/670 |
| 7,096,665 B2 * | 8/2006 | Stinger et al. | 60/651 |
| 8,176,724 B2 * | 5/2012 | Smith | 60/39.53 |
| 2002/0162330 A1 | 11/2002 | Shimizu et al. | |
| 2004/0182082 A1 | 9/2004 | Saranchuk et al. | |
| 2005/0132713 A1* | 6/2005 | Neary | 60/784 |
| 2009/0241860 A1 | 10/2009 | Monacelli et al. | |
| 2010/0043433 A1* | 2/2010 | Kelly | 60/641.2 |
| 2010/0055010 A1 | 3/2010 | Froderberg et al. | |
| 2010/0071368 A1 | 3/2010 | Kaplan et al. | |
| 2010/0242476 A1* | 9/2010 | Ast et al. | 60/645 |
| 2011/0000205 A1* | 1/2011 | Hauer et al. | 60/511 |
| 2011/0209474 A1 | 9/2011 | Leibowitz | |
| 2011/0239700 A1* | 10/2011 | Hasse et al. | 62/617 |

FOREIGN PATENT DOCUMENTS

| | | | |
|---|---|---|---|
| DE | 10227709 A1 | | 2/2003 |
| JP | 2000282810 A | * | 10/2000 |
| JP | 2001-108201 A | | 4/2001 |
| KR | 101045802 B1 | | 7/2011 |
| WO | 02/073007 A2 | | 9/2002 |
| WO | 2004/033859 A1 | | 4/2004 |
| WO | 2006/028444 A1 | | 3/2006 |
| WO | 2006/105815 A1 | | 10/2006 |
| WO | 2012/076902 A1 | | 6/2012 |
| WO | 2012151055 A2 | | 11/2012 |
| WO | 2013/043999 A2 | | 3/2013 |

OTHER PUBLICATIONS

International Search Report and Written Opinion mailed Nov. 16, 2012; Application No. PCT/US2012/034199 in the name of Harris Corporation.
Information about Related Patents and Patent Applications, see section 6 of the accompanying Information Disclosure Statement Letter, which concerns Related Patents and Patent Applications. Jan. 10, 2013.
International Search Report and Written Opinion issued on Oct. 9, 2013 in PCT/US2012/056524 to Harris Corporation (11 pages).
International Search Report and Written Opinion mailed Oct. 9, 2013 in International Application No. PCT/US2013/047750 (11 pages).
International Search Report and Written Opinion mailed Oct. 10, 2013 for International Patent Appln. No. PCT/US2013/0141506 to Harris Corporation (13 pages).
International Search Report and Written Opinion mailed Oct. 9, 2013 for International Patent Appln. No. PCT/US2013/051857 (11 pages).
International Preliminary Report on Patenability mailed Apr. 3, 2014, in application Serial No. PCT/US2012/056524 in the name of Harris Corporation.
Reference to U.S. Appl. No. 14/138,903, filed Dec. 23, 2013.
Reference to U.S. Appl. No. 13/859,106, filed Apr. 9, 2013.
Reference to U.S. Appl. No. 14/139,094, filed Dec. 23, 2013.
Reference to U.S. Appl. No. 13/859,355, filed Apr. 9, 2013.
Reference to U.S. Appl. No. 13/859,409, filed Apr. 9, 2013.
Reference to U.S. Appl. No. 13/533,497, filed Jun. 26, 2012.
Reference to U.S. Appl. No. 13/239,674, filed Sep. 22, 2011.
Reference to U.S. Appl. No. 13/477,394, filed May 22, 2012.
Reference to U.S. Appl. No. 13/556,387, filed Jul. 24, 2012.

* cited by examiner

| Example 1 | | | |
|---|---|---|---|
| Net Power | | 468 | kW |
| Qin (Energy In) | | 1,021 | kW |
| Cycle Efficiency | | 46% | |
| Boiler (510) | | | |
| Working Fluid 1 (Rankine Cycle Portion) | Pentane | | |
| Temperature Entering the Boiler | | 160 | °F |
| Temperature leaving the Boiler | | 500 | °F |
| Mass Flow Rate of Pentane | | 3.2 | lb/s |
| Pentane Pressure leaving the Boiler | | 350 | psia |
| First Expander (508) | | | |
| Working Fluid 1 (Rankine Cycle Portion) | Pentane | | |
| Work Out | | 125 | kW |
| Expander Efficiency | | 85 | % |
| Portion of the Cycle Work | | 12.2 | % |
| Compressor (502) | | | |
| Working Fluid 2 (Brayton Cycle Portion) | Pentane, Helium and Nitrogen | | |
| Pentane Spray Mass Flow Rate | | 3.5 | lb/s |
| - Portion of Pentane Spray within Working Fluid 2 | | | |
| Pentane Recirculation Mass Flow Rate | | 2.8 | lb/s |
| - Portion of Pentane not fully condensed within Working Fluid 2 | | | |
| Helium Mass Flow Rate | | 4.4 | lb/s |
| - Portion of Helium within Working Fluid 2 | | | |
| Nitrogen Mass Flow Rate | | 3.8 | lb/s |
| - Portion of Nitrogen within Working Fluid 2 | | | |
| CoP Compressor | | 1.64 | |
| - The Latent Heat effect of transfering heat from the Helium and Nitrogen to the Pentane during compression | | | |
| Compressor Efficiency | | 82 | % |
| Compressor Work in | | (1,671) | kW |
| Mixing Chamber (504) | | | |
| Mixer Pressure | | 120 | psia |
| Combined Fluid Temperature | | 336 | °F |
| Combined flow | | 17.6 | lb/s |

FIG. 18A

| | | |
|---|---:|---|
| Second Expander (506) | | |
| Temperature Entering Expander | 336 | °F |
| Pressure Entering Expander | 120 | psia |
| Temperature Leaving the Expander | 105 | °F |
| Pressure Leaving the Expander | 20 | psia |
| Total Mass Flow Rate | 17.6 | lb/s |
| Expander Efficiency | 56 | % |
| Expander Work out | 2,318 | kW |
| Condenser (512) | | |
| Temperature Entering Condenser | 105 | °F |
| Pressure Entering Condenser | 20 | psia |
| Temperature Leaving Condenser | 78 | °F |
| Pressure Leaving Condenser | 15 | psia |
| Condenser Liquid Drop Out (Pentane) | 6.6 | lb/s |
| Pump (501) | | |
| Heat Pump Work in | (156) | kW |
| Gross Q Transferred | 398 | kW |
| CoP of Heat Pump | 3 | |
| Heat Pump Efficiency | 85 | % |
| System Thermal & Mechanical Losses | (148) | kW |

FIG. 18B

HYBRID IMBEDDED COMBINED CYCLE

BACKGROUND OF THE INVENTION

1. Statement of the Technical Field

The invention concerns thermal energy cycles, and more particularly systems and methods for merging thermal energy cycles including multi-pass energy recirculation techniques which enable normally rejected thermal energy to be re-used in the cycle, repeatedly.

2. Description of the Related Art

Heat engines use energy provided in the form of heat to perform mechanical work, and exhaust a portion of the applied heat which cannot be used to perform work. This conversion of heat energy to mechanical work is performed by taking advantage of a temperature differential that exists between a hot "source" and a cold "sink." This well known concept is illustrated in FIG. 1 which shows a hot reservoir, a cold reservoir and an intermediate thermodynamic cycle which generates work as an output. Heat engines can be modeled on various different well known thermodynamic processes or cycles. Two such well known heat engine cycles include the Brayton cycle and the Rankine cycle.

The closed Brayton cycle is shown in FIG. 2. A working fluid is pressurized in a compressor 202 which performs work ($W_{in2}$) and then heated ($Q_{in2}$) by heat source 204. The heated pressurized working fluid then releases energy by expanding through a turbine 206. A portion of the work ($W_{out2}$) which is extracted from the heated and pressurized working fluid by the turbine 206 is used for driving the compressor 202. The working fluid is then cooled ($Q_{out2}$) in a cooler 208 and the cycle is repeated.

The foregoing example is one in which the Brayton cycle is run as a closed cycle. The Brayton cycle can also be run as an open cycle (open Brayton cycle). In such an arrangement, ambient air is drawn into a compressor, where it is pressurized. The compressed air is communicated to a combustion chamber where fuel is burned and the compressed air is heated in an isobaric process (i.e. at constant pressure). The heated and pressurized air is thereafter caused to expand through a turbine where mechanical work is produced. Some of this work is used to drive the compressor. The air is thereafter permitted to exhaust from the turbine into the ambient environment (the atmosphere). Gas turbine engines examples of open Brayton cycles and are common on aircraft and in power plants.

FIG. 3 illustrates the basic features of the Rankine cycle. In the Rankine cycle, a liquid working fluid is pumped from low to high pressure by a pump 302, thereby adding work to the system ($W_{in3}$). The pressurized working fluid is then passed to a boiler 304 where it is heated ($Q_{in3}$) at constant pressure by a suitable heat source to become a vapor. The vapor thereafter expands through an expander or turbine 306, providing work ($W_{out3}$) as an output. This process of expanding through the turbine results in a decrease in pressure and temperature for the vapor, and may include some condensation. The vapor and condensation are then passed to a condenser 308 where the vapor is condensed or cooled to remove heat ($Q_{out3}$) at a constant pressure to become a liquid. The liquid is then passed to the pump, after which the process is repeated.

A combined cycle is an assembly of two or more engines that convert heat into mechanical energy by combining two or more thermodynamic cycles. The exhaust of one heat engine associated with a first cycle is used to provide the heat source that is used in a second cycle. For example, an open Brayton cycle is commonly combined with a Rankine cycle to form a combined cycle for power plant applications. The open Brayton cycle is typically implemented as a turbine burning a fuel, and the exhaust from this combustion process is used as the heat source in the Rankine cycle. In such a scenario, the Rankine cycle is referred to as a bottoming cycle because it uses some waste heat from the Brayton cycle to perform useful work. When using high temperature sources of heat (e.g. 2000° F.), a combined open Brayton cycle with a Rankine bottoming cycle can ideally be expected to provide an energy conversion efficiency as high as 60%. In the case of low temperature heat sources (e.g. 700° F.) conversion efficiencies are much lower, traditionally below about 35%.

SUMMARY OF THE INVENTION

The invention concerns a method for producing work from heat. The method involves heating a pressurized flow of a first working fluid to form a first vapor and compressing a second working fluid in the form of a second vapor. Thereafter, thermal energy is transferred directly from the first vapor to the second vapor, exclusive of any intervening structure. The method further involves expanding a mixture of the first and second vapor to perform useful work, either after or during the transferring. According to one aspect of the invention, at least a portion the heat transferred from the first vapor to the second vapor is comprised of a latent heat of vaporization of the first working fluid. The method can continue with the step of separating a condensate of the first vapor from the second vapor. As part of the separating step, a cooling loop can be used that is independent of the first and second working fluids to remove heat from the first and second vapor. After the fluids are separated they are available to be re-used respectively for the heating and compressing steps.

The method can include as part of the separating step, an evaporative process in which the condensate functions as a refrigerant in an evaporator. A portion of the condensate, which is comprised of the first working fluid, is converted to a vapor within the evaporator. This results in a temperature reduction in the first working fluid within the evaporator. The evaporator is advantageously disposed in an environment which comprises the mixture of the first and second vapor exhausted from the expanding step. With the evaporator so disposed, heat can be transferred from the first and second vapor to the condensate (i.e., first working fluid) within the evaporator. Accordingly, the evaporator performs a kind of pre-heating of the first working fluid prior to that portion of the first working fluid being re-used in the heating and compressing steps. In an alternative embodiment, cooling the second working fluid is accomplished by spraying a liquid into a flow of the second working fluid before or during the compressing. The liquid can be the first working fluid.

According to one aspect of the invention, a ratio of the first vapor to the second vapor contained in the mixture can be dynamically varied. According to another aspect of the invention, the first and second working fluids are selected to have the same chemical composition. According to a third aspect of the invention, heat can be added to the mixture of the first and second vapor from an external thermal source. In a further embodiment of the invention, an extra expanding step is performed. This additional expanding step is advantageously performed prior to the mixing step. In particular, the first vapor is expanded so as to perform work prior to the mixing.

The invention also concerns an apparatus for producing work from heat in accordance to with the method described above. The apparatus includes a boiler which is configured for heating a pressurized flow of a first working fluid to form a first vapor. A compressor is provided which is arranged to compress a second working fluid in the form of a second vapor. Notable is that the first and second fluids as described do not have to comprise a singular chemical structure, and therefore may comprise tailored chemical compositions. The apparatus also includes a mixing chamber which receives the first and second vapor. The mixing chamber is configured for transferring thermal energy directly from the first vapor to the second vapor, exclusive of any intervening structure. The mixing chamber is optionally configured to add heat to the mixture of the first and second vapor from an external thermal source. The invention also includes an expander. The expander is arranged to expand a mixture of the first and second vapor received from the mixing chamber. As such, the expander uses the first and second working fluid to perform work after or during the transferring operation. Notably, the thermal energy that is transferred from the first vapor to the second vapor will generally include at least a portion of a latent heat of vaporization of the first working fluid.

The apparatus also includes a condenser. The condenser is advantageously configured for receiving the mixture of first and second vapor, and separating a condensate of the first vapor (the first working fluid) from the second vapor (the second working fluid). The condenser can be operatively associated with a cooling loop. The cooling loop is arranged to cool the first and second vapor, but is otherwise independent of the first and second working fluids. The apparatus is advantageously configured to re-use the condensate and the second vapor which have been separated by the condenser. In particular, the condensate (first working fluid) and the second vapor (second working fluid) are re-used respectively, in the boiler and the compressor.

In an embodiment of the invention, the apparatus can also include an evaporator in which the condensate of the first vapor also functions as a refrigerant. In this regard, the apparatus can be arranged to convert at least a portion of the condensate (first working fluid) to a vapor within the evaporator. The conversion to vapor results in a cooling effect. The evaporator containing such cooled first working fluid can be disposed within the condenser, or can be disposed adjacent to the condenser in order to absorb available waste or reject heat from other portions of the overall cycle. The evaporator transfers heat from the mixture to the first working fluid within the evaporator. This transfer of heat allows the first working fluid to be effectively pre-heated prior to the re-use in the boiler and/or as spray in the compressor.

The apparatus can also include a spray system. The spray system can be configured to cool the second working fluid by spraying a liquid directly into a flow of the second working fluid before or during compressing operations in the compressor. In such an embodiment, the liquid used for the spray can advantageously be the first working fluid. The apparatus can also include one or more control devices which are configured to permit dynamic variation of a ratio of the first vapor to the second vapor entering the mixing chamber. According to one aspect of the invention, the first and second working fluids can have the same chemical composition.

BRIEF DESCRIPTION OF THE DRAWINGS

Embodiments will be described with reference to the following drawing figures, in which like numerals represent like items throughout the figures, and in which:

FIGS. 18A and 18B are a table which is useful for obtaining a more detailed understanding of the system described in FIG. 13.

DETAILED DESCRIPTION

The present invention is described with reference to the attached figures. The figures are not drawn to scale and they are provided merely to illustrate the general embodiment of the invention. Several aspects of the invention are described below with reference to example applications for illustration. It should be understood that numerous specific details, relationships, and methods are set forth to provide a full understanding of the invention. One having ordinary skill in the relevant art, however, will recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention concerns a method for producing work from heat. A flowchart is provided in FIG. 4 as an aid to understanding the method. The method 400 can begin with step 402 heat, where heat is added to a first working fluid (liquid) under pressure to produce pressurized vapor (first vapor). In step 404, work is optionally performed in a first expander by expanding the first vapor; however, this step is not essential and can be omitted in some embodiments of the invention. In such embodiments, the pressurized vapor from step 402 can be communicated directly to mixing step 408.

Concurrent with steps 402 and 404, a second vapor formed of a second working fluid is compressed in step 406. In some embodiments, an optional liquid spray can be added in step 405 to the second working fluid before or during the compressing step for cooling purposes. Thereafter, in step 408, the first vapor is mixed with the second vapor at approximately the same pressure to form a vapor mixture. The vapor mixture is sometimes referred to herein as a third working fluid or third vapor. In optional step 409 additional heat can be added to the vapor mixture (third vapor) from a source that is external to the system. The addition of heat at this stage of the cycle is not essential in some cases and can be omitted.

In step 410, work is performed by means of expansion of the vapor mixture. The expansion of the vapor mixture is facilitated by providing a pressure drop across a second expansion device. In step 412, the first vapor is condensed in a condenser to recover the first liquid. The second vapor is permitted to remain in a vapor state. At this point, the process can be repeated by re-compressing the second vapor at step 406, and re-heating the first liquid at step 402.

Figure 5:
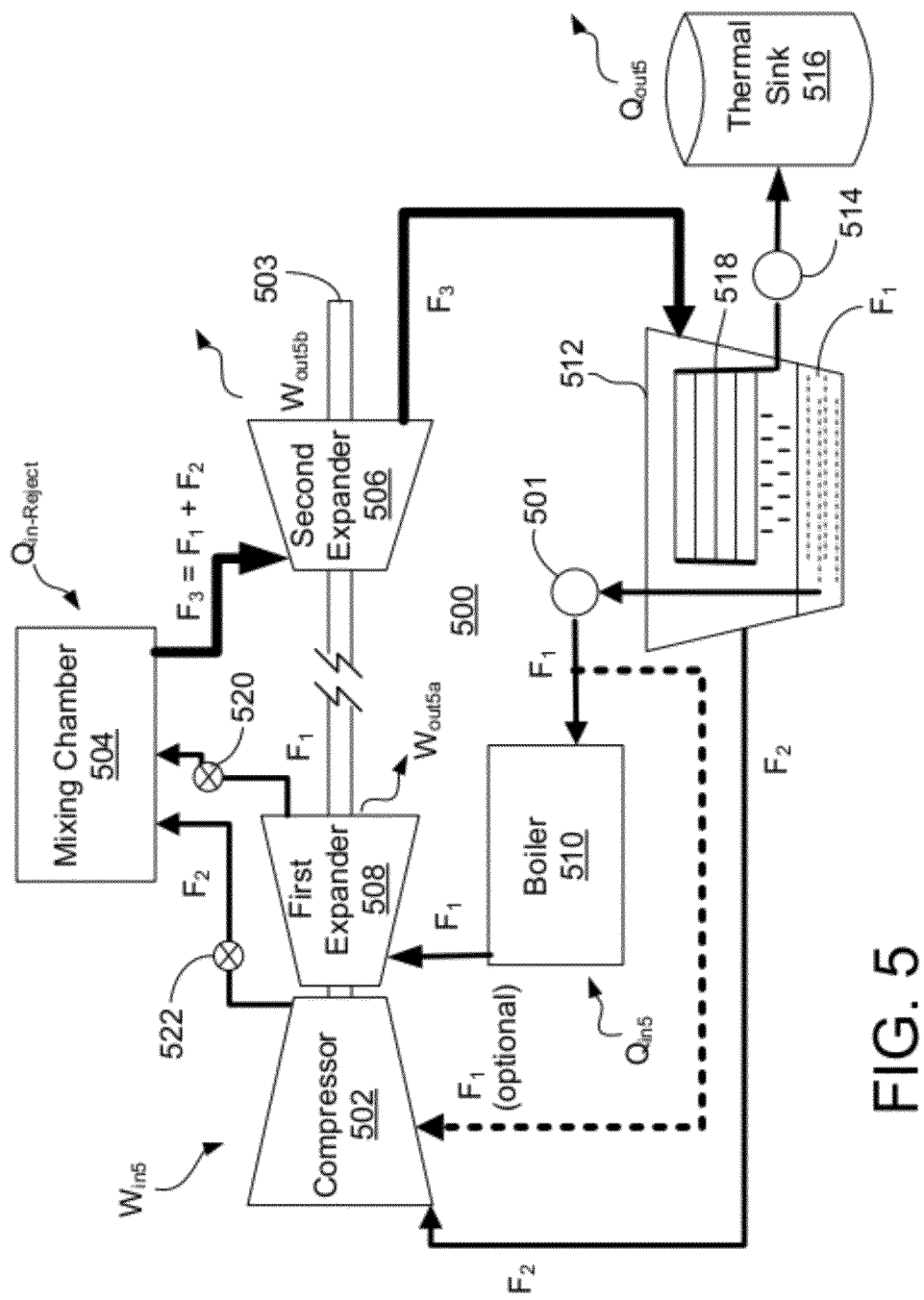
FIG. 5 is a drawing that is useful for understanding an apparatus configured for implementing the hybrid imbedded combined cycle in FIG. 4.

The method 400 will now be described in further detail in relation to a heat engine 500 which is shown in FIG. 5. The heat engine 500 is capable of implementing the method 400. However, it should be appreciated that the heat engine 500 is merely provided by way of example and is not intended to limit the invention. Many variations of heat engines incorporating the inventive methods are possible. For example the shaft compressing 502, 508 and 506 is not required to be continuous Likewise other components can be substituted provided that the heat engine is capable of carrying out the various steps in method 400. Accordingly, a heat engine incorporating the inventive methods can include more or fewer components or steps and still remain within the scope of the invention.

Referring now to FIG. 5, a first liquid working fluid ($F_1$) is pressurized using a pump 501. The pressurized fluid is then communicated to boiler 510, which adds a predetermined amount of heat $Q_{in5}$ to the first working fluid from a heat source. As a result of one or more of these operations, the first working fluid is converted to a first vapor. Thereafter, the first vapor is optionally communicated to a first expander 508 where work $W_{out5a}$ is performed. Any suitable expander can be used for this purpose, provided that it is capable of using a pressurized vapor to perform useful work. For example, the first expander can be an expansion turbine or turbo-expander, a vane expander or reciprocating expander, although the invention is not limited in this regard.

Once the first vapor has been used to perform work $W_{out5a}$ in the first expander 508, it is exhausted from the expander to a mixing chamber 504 (which is sometimes referred to herein as a mixer). The first vapor will contain thermal potential energy (heat energy) after it passes through first expander 508, which shall be referred to herein as $Q_{in\text{-}Reject}$.

As noted above, the cycle does not necessarily require an expansion step wherein the first working fluid is expanded in the first expander 508. In such embodiments, the first vapor can be communicated directly from the boiler 510 to the mixing chamber 504, discussed below. The choice of using or not using the first expander 508 will depend on various design considerations. For example, computer modeling has shown that when the heat source temperature is relatively high, use of the first expander can substantially improve system efficiency. At lower source temperatures, it has been found that the expander has less effect on efficiency.

Concurrent with the operations described above involving the first working fluid, a second working fluid ($F_2$) in the form of a second vapor is compressed in a compressor 502. This step will involve the input of work into the system, which is represented in FIG. 5 as $W_{in5}$. The compressed vapor from compressor 502 is thereafter communicated from the compressor to the mixing chamber 504. Within the mixing chamber 504, the first vapor and said second vapor are combined or mixed to form a third working fluid (third vapor) $F_3$ which is a mixture of the first and second vapor. Due to this mixing of the working fluids, a thermal transfer between the fluids readily occurs such that at least a portion of the heat associated with the first vapor ($Q_{in\text{-}Reject}$) can be transferred to the second vapor. Optionally, additional heat can be provided at this point to the third working fluid contained in the mixing chamber. For example, the additional heat can be provided to the mixer from a source that is external to the system shown in FIG. 5.

It should be noted that it is not necessary for all heat transfer from the first vapor to the second vapor to occur within the mixing chamber 504. In some embodiments of the invention, a portion of such heat transfer can occur after the third vapor exits the mixing chamber 504. For example, in an embodiment of the invention, at least a portion of such heat transfer can continue occurring as the third vapor continues through an expansion cycle discussed below. Also, it is possible for the fluids to enter the mixer at approximately the same temperature. However, as a result of the different chemical compositions of such fluids, transfer or exchange of heat as between them can still potentially take place in a subsequent expansion cycle. Details of the expansion cycle are discussed below with regard to expander 506.

Significantly, the thermal transfer described above occurs directly between the mixed working fluids and not across physical boundaries as would be the case if a conventional heat exchanger was used for this purpose. Consequently, the transfer of heat from the first vapor to the second vapor can occur in a way that is substantially instantaneous, and highly efficient.

The mixing chamber 504 receives vaporous fluid volumetric flow of $F_1$ at pressure $p_1$ and vaporous fluid volumetric flow of fluid $F_2$ at pressure $p_2$, where $p_1$ and $p_2$ are substantially the same pressure. In an embodiment of the invention, the volume of the mixing chamber is not restrictive with respect to the flow of fluid $F_1$ and $F_2$. Accordingly, the volume of the mixing chamber can be selected to be $V_{F1}+V_{F2}=V_{F3}$ where $V_{F1}$ is the volumetric flow rate of fluid $F_1$, $V_{F2}$ is the volumetric flow rate of fluid $F_2$, and $V_{F3}$ is the sum of the volumetric flow rate of fluid $F_1$+ fluid $F_2$ at a near constant pressure. Still, the invention is not limited in this regard and the volume of the mixing chamber 504 could be increased or decreased, thereby providing the potential to change the flow velocity and having affect on the pressure of the third working fluid $F_3$ (third vapor $F_3$).

The third vapor formed by mixing the first and second vapor is communicated under pressure from the mixing chamber 504 to second expander 506 for performing useful work. The useful work produced by second expander 506 is identified in FIG. 5 as $W_{outb}$. Well known conventional expander technology can be used for this purpose, provided that it is capable of using a pressurized vapor to perform useful work. For example, the second expander can be an expansion turbine, turbo-expander, vane expander or reciprocating expander. Advantageously the expander will be selected by those skilled in the art, to provide the highest conversion efficiency based on the specific properties of $F_3$ delivered to the expander, and for a particular embodiment of the cycle. Still, the invention is not limited in this regard. After such work is performed by the second expander 506, the third vapor is communicated from the second expander to a condenser 512.

The condenser 512 can be any device capable of condensing a working fluid from its vapor state to its liquid state. As is well known in the art, condensing is commonly performed by cooling the working fluid under designated states of pressure. In the exemplary arrangement in FIG. 5, cooling can be provided by evaporator 518 as a means of efficiently lowering the temperature in the condenser. As will be appreciated by those skilled in the art, this cooling process will generally involve a release of heat by the third working fluid. The cooling process is further accomplished by moving the heat from the condenser to the thermal sink 516 by means of pumping and/or refrigeration. The heat that is removed from the condenser shall be referred to herein as $Q_{out5}$. In this example $Q_{out5}$ also includes heat lost directly from the condenser 512 to the atmosphere by means of conduction and/or convection. According to some embodiments, the condenser 512 can be a heat exchanger which utilizes a pump 514 in an arrangement that is well known in industrial plant processes where the heat can be transferred to a coolant. The performance of the condenser is reliant on many factors, including the properties of the constituent fluids, the flow rates of the fluids, the ratios of the fluids, the condenser pressure and temperature, and hardware or apparatus physical configuration. These are all common variables that are well understood by those skilled in the art of condenser designs.

In the present invention, the condenser 512 advantageously is configured to convert the first vapor $F_1$ to a condensate within said condenser, but does not condense the second working fluid $F_2$. In other words, the second working fluid remains in a vaporous state. Those skilled in the art will appreciate that this can be accomplished by choosing the first and second working fluid to have different physical properties. With the first and second working fluid collected within the condenser in this way, the process has returned to its starting point, with the first working fluid in a liquid form, and the second working fluid in a vaporous state. Thereafter, the entire process described above can be repeated in a continuous cycle using the first and second working fluid collected in the condenser.

Those skilled in the art will appreciate that, in practice, condensers often fail to completely condense 100% of a vapor that is intended to be condensed. Accordingly, condenser 512 in the present embodiment may not actually condense 100% of the first vapor from the vaporous mixture (third vapor). However, this condition is acceptable for purposes of the present invention, and a portion of the non-condensed first vapor can be permitted to remain mixed with the second vapor, continuing on to the compressor 502. For purposes of the present description, the portion of the non-condensed vapor can be considered a constituent of $F_2$ by design.

The heat engine 500 and the associated cycle can be optimized based on the temperatures and pressures of the cycle fluids internal to the cycle, in concert with selection of the most appropriate chemical configurations of the fluids. For example, the first and second working fluid can in some embodiments be comprised of different chemical compositions. However, the invention is not limited in this regard, and it is also possible to operate the cycle such that the first fluid and the second fluid are in fact the same chemical fluid. In such an embodiment, the percentage of condensation, or dropout rate of fluid $F_3$ within condenser 512 is managed to effectively let some portion (or percentage) of the fluid pass through the cycle in a vapor state (so it can be re-used as $F_2$) while permitting the remaining portion to condense to a liquid state (so that it can be re-used as $F_1$).

Figure 1:
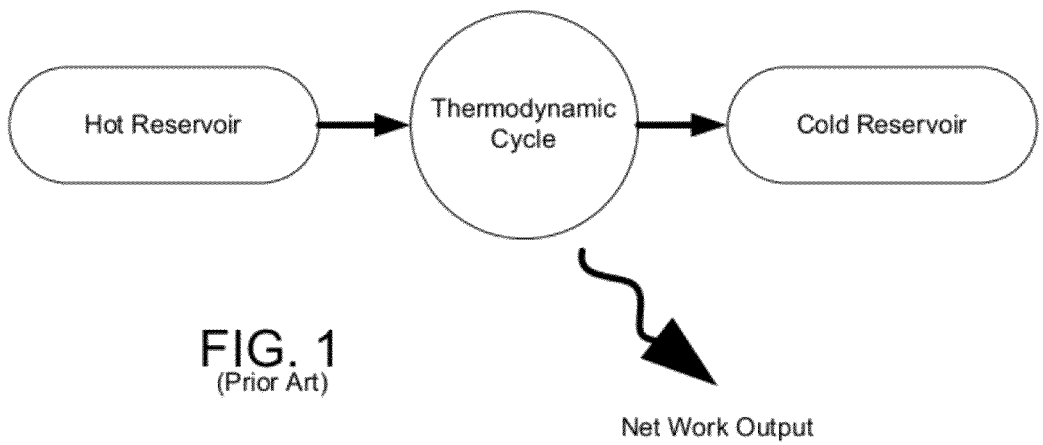
FIG. 1 is a drawing that is useful for illustrating a basic concept relating to thermodynamic cycles.
Figure 2:
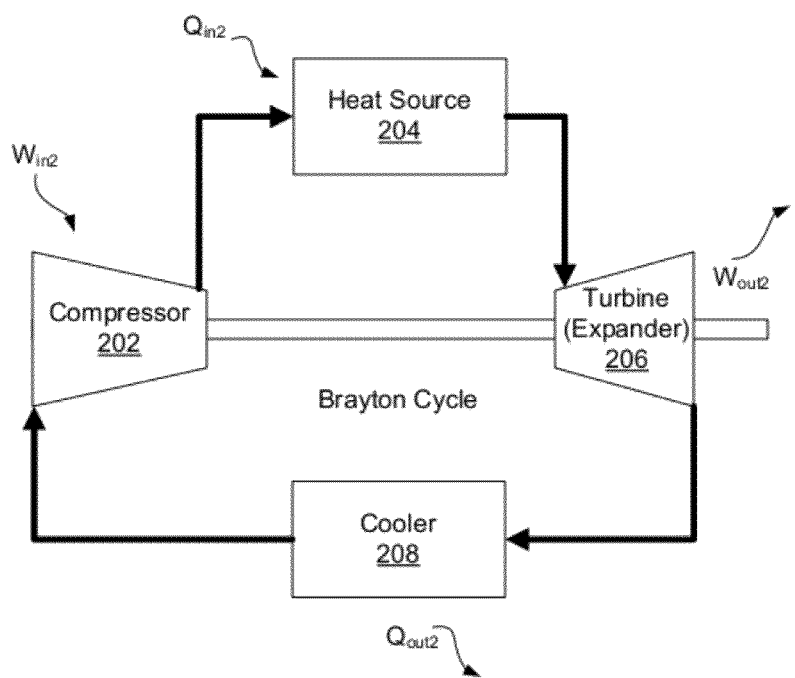
FIG. 2 is a drawing that is useful for understanding a closed Brayton cycle.
Figure 3:
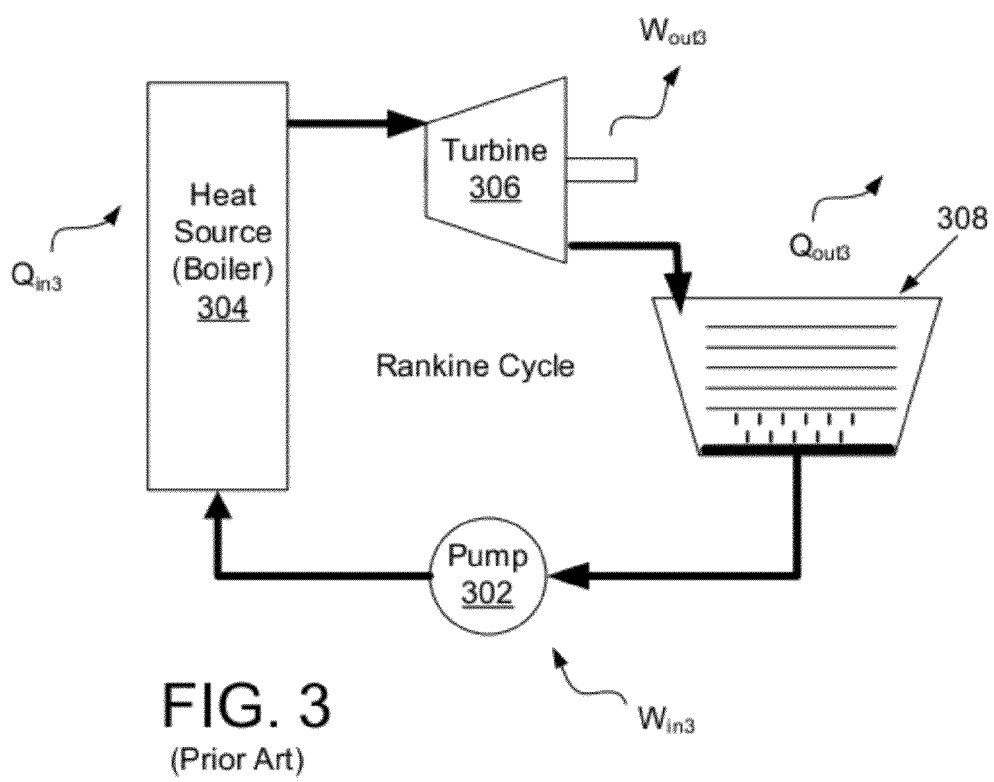
FIG. 3 is a drawing that is useful for understanding a Rankine cycle.
Figure 4:
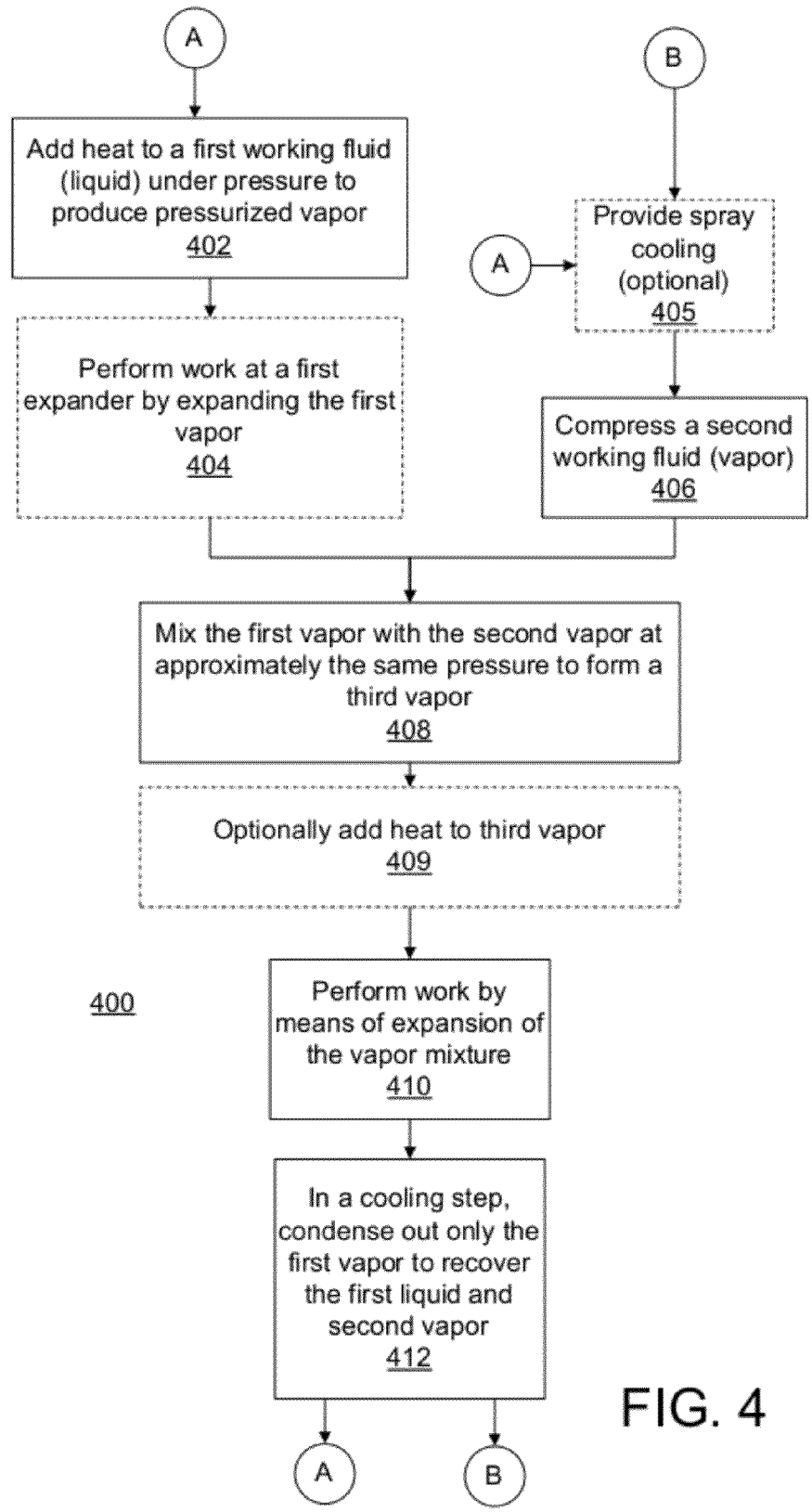
FIG. 4 is a flow chart that is useful for understanding a hybrid imbedded combined cycle.

The foregoing processes described in FIG. 5 corresponds to certain steps of the cycle described in FIG. 4. For example, the pumping and heating of the first working fluid at pump 501 and boiler 510 will generally correspond to step 402. The process of expanding the first working fluid in the first expander 508, and cooling the working fluid will generally correspond to steps 404 and 412 in FIG. 4. Those skilled in the art will recognize that the pumping, heating, expanding and cooling processes of steps 402, 404, 410, 412 respectively, are analogous to those which are performed in a conventional Rankine cycle. Accordingly, it is convenient to sometimes refer to this portion of the cycle as the Rankine portion of the cycle, or more simply the Rankine cycle portion.

Similarly, the process of compressing the second vapor in compressor 502, mixing in mixing chamber 504, and the optional addition of heat to the third vapor contained in the mixing chamber, can generally correspond to steps 406, 408 and 409 in FIG. 4. The expansion of the vapor mixture (third vapor) in the second expander 506, and subsequent condensing processing in condenser 512 can generally correspond to steps 410 and 412 in FIG. 4. Those skilled in the art will recognize that the compressing, heating, expanding and cooling processes performed compressor 502, mixing chamber 504, second expander 506, and condenser 512 are analogous to those which are performed in a conventional closed Brayton cycle. Accordingly, it is convenient to sometimes refer to this portion of the cycle as the Brayton cycle portion, or the Brayton portion of the cycle.

Notably, there are some aspects of the cycle in FIGS. 4 and 5 that are common to both the Rankine portion of the cycle, and the Brayton portion of the cycle. These common portions exist where the Brayton and Rankine portions of the cycle overlap. In FIG. 4, the common steps would involve the mixing step (408), the optional addition of heat to the third vapor (409), the expanding step (410), and the condensing step (412). In FIG. 5, these processes would be performed in the mixing chamber 504, the second expander 506, and the condenser 512. In fact, it can be said that a portion of the Rankine cycle is imbedded in the Brayton cycle. As such, it is convenient to sometimes refer to that portion of the cycle where the two working fluids are mixed, as the imbedded cycle portion.

The method described with respect to FIGS. 4 and 5 has many advantages over conventional systems. For example, the method provides extremely high thermal transfer rates which are made possible by having the working fluid be the heat exchanger (or act in the capacity of a heat exchanger). A further advantage is gained in the present invention by selecting the fluid chemical properties, temperatures and pressure such that the latent heat of vaporization is used for thermal exchange purposes. In particular, the boiler 510 can at least provide the first working fluid ($F_1$) with thermal energy equal to the latent heat of vaporization for such working fluid. Those skilled in the art will appreciate that liquid to vapor transformations provide very high thermal capacity.

The high thermal transfer rate accomplishes two important objectives. First, the direct mixing process eliminates the need for the addition of heat exchanger hardware that represents additional costs associated with purchase, real-estate and maintenance. Second, the direct mixing increases the thermal transfer efficiency, effectively enabling the cycle to operate with advantageously near instantaneous thermal transfer. By enabling these higher thermal transfer rates between the working fluids, and allowing them to work together, it is possible to extract more useful energy from the mass flow rate of the combination than would otherwise be possible using the same thermal (temperature) reference. Consequently, more of the thermal potential energy contained in the first fluid is available to perform work in the expander 506 when the mixed fluids act in unison within the expansion process.

The cycle and associated apparatus described with respect to FIGS. 4 and 5 has the potential to increase the conversion efficiency of relatively low temperature heat resources (e.g., less than 800° F.) to the point where they can be competitive with hydrocarbon based energy resources. One aspect of the invention that permits this important result involves adding the volumes of the fluids $F_1$ and $F_2$ (in vapor state) in the mixing chamber 504. The process of combining the two vapors facilitates providing relatively large quantities of available energy to the second expander 506. Note that the Rankine portion of the cycle (pump 501, boiler 510, and first expander 508) alone creates little available vapor volume (relative to the substantial amounts of heat energy added) but, this fluid transports very large quantities of thermal capacity. Conversely, the Brayton portion (first compressor 502, mixing chamber 504, second expander 506, condenser 512) alone has large volumetric capacity but less effective or less efficient thermal exchange capacity. The combination of thermal capacity and volumetric capacity enable a larger potential to extract work for each unit of thermal energy added.

In the present invention, a large quantity of heat energy is extracted from the thermal source by means of vaporization. The latent heat of vaporization provides a useful method for converting very large quantities of heat in the liquid into kinetic energy residing in the vapor. Still, the ability of the vaporous fluid to perform work and therefore create power is constrained by the overall volume that is created (relative to the heat that is consumed in creating that volume). In order to overcome this limitation, it is advantageous to have a large volume second fluid that facilitates the process of producing the actual power.

Providing a large volume second fluid in vaporous form presents another challenge. In particular, vaporous fluids tend to be difficult to heat by heat exchanger means, as such devices are governed by principles of convection. The invention overcomes the limitations of the prior art, and facilitates improved efficiency by moving large quantities of thermal potential energy to the first working fluid $F_1$ (in the Rankine portion of the cycle), and then transferring this thermal energy directly to the second working fluid (in the Brayton portion of the cycle) by mixing the first and second working fluids. Notably, a Brayton cycle and a Rankine cycle each has the capability to convert thermal energy to power at a relatively low efficiency (typically <15% assuming 325° F. is the heat source temperature). However, by combining the methods of these independent cycles, where the best features of each is utilized, it is possible that the resulting efficiency can be considerably higher.

Figure 6:
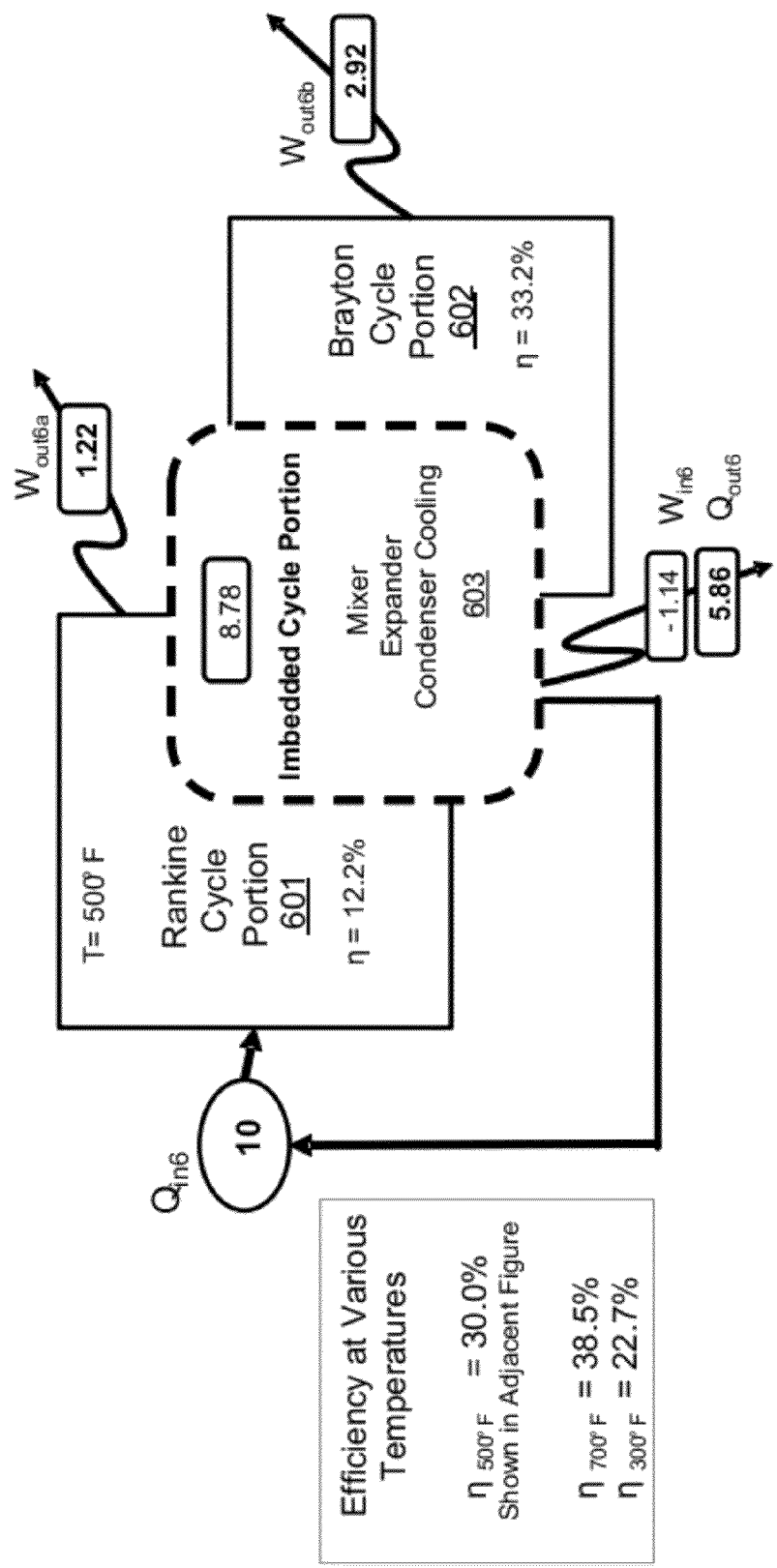
FIG. 6 is a drawing that is useful for understanding an efficiency of the hybrid imbedded combined cycle in FIG. 4.

Referring now to FIG. 6, there is shown a diagram that is useful for understanding an efficiency of the cycle described above with respect to FIGS. 4 and 5. In FIG. 6, a first block 601 generally represents the Rankine cycle portion of FIGS. 4 and 5, a second block 602 generally represents the Brayton cycle portion of FIGS. 4 and 5, and a third block 603 represents the imbedded cycle portion in FIGS. 4 and 5. The imbedded cycle portion 603 is shown as overlaying blocks 601 and 602 since the imbedded cycle portion actually incorporates portions of the Rankine cycle portion and the Brayton cycle portion. In the computer modeling described below with respect to FIG. 6, the optional first expander 508 is included as part of the modeled system; but optional step 409 is assumed to be omitted (i.e., no additional heat from any external source is added to the working fluids in the mixing chamber 504). Also, the fluids used in this model were assumed to be as follows: first working fluid $F_1$ (Rankine cycle portion)=100% Pentane or (optionally could be 50% pentane and 50% methanol); second working fluid $F_2$ (Brayton cycle portion)=24% Pentane, 49% Helium, 27% Nitrogen by total mass of Fluid 2. The relative mixture of the first and second working fluids contained in the third working fluid was assumed to be as follows: 39% first working fluid ($F_1$) and 61% second working fluid ($F_2$). The second working fluid described (partitioned) as a percentage of total mass flow would be 15% pentane, 30% Helium, 16% Nitrogen. In other words, these values represent the percentages of the constituents as a function of the total mass flow rate or $F_1+F_2$.

Figure 13:
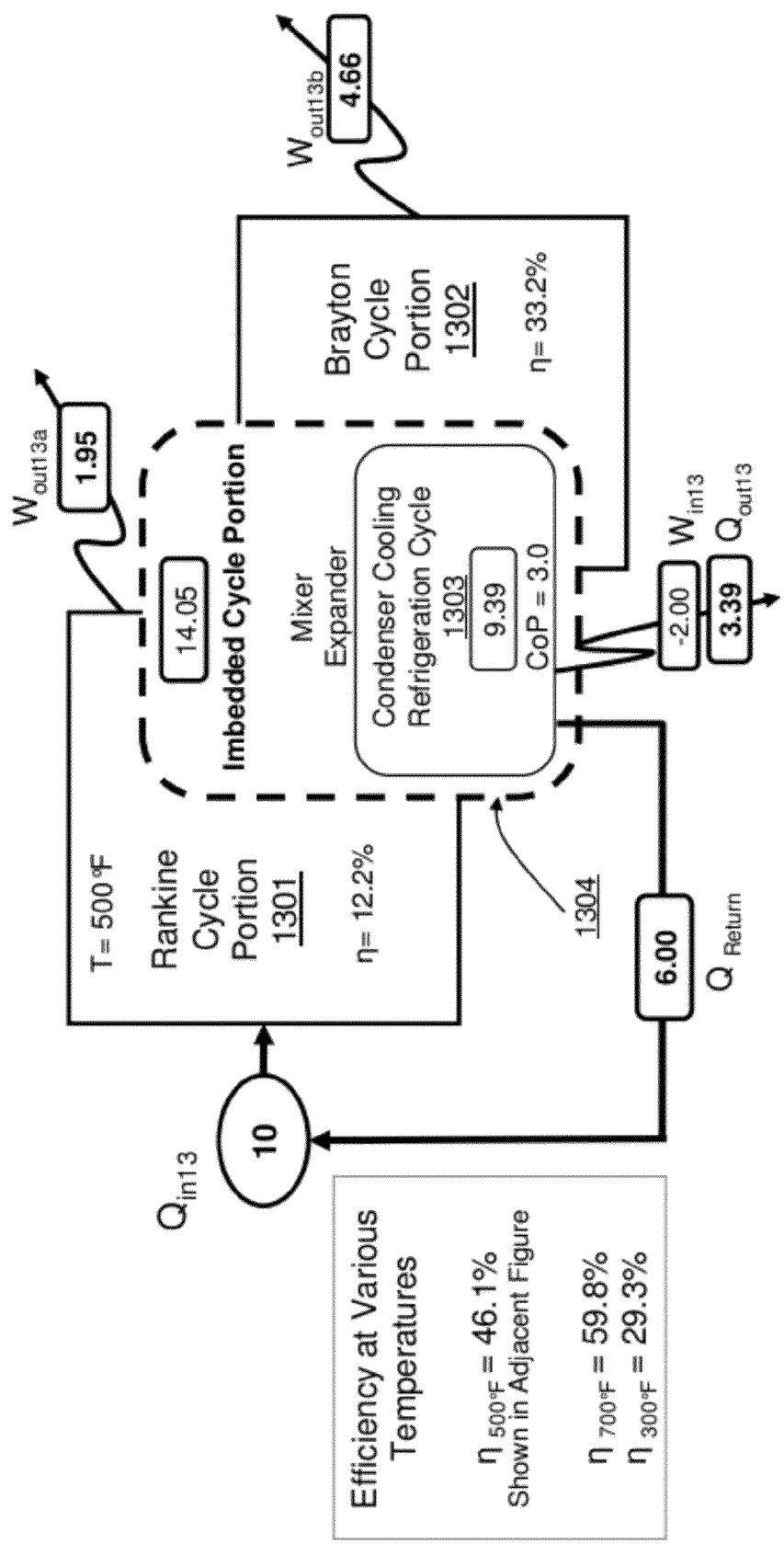
FIG. 13 is a diagram that is useful for understanding an efficiency of the hybrid imbedded combined cycle of FIG. 12.

Notably, the drawing shows the cycle efficiency for a relatively low reference temperature, T=500° F. Cycle efficiency calculation results in FIG. 13 are also shown for T=700° F., and T=300° F. The cycle efficiency in each instance is determined by detailed computer modeling involving many variables. The examples presented attempt to be consistent in using nominal values as opposed to ideal values. As will be appreciated by those skilled in the art, a relatively low temperature regime is typical for heat derived from certain renewable energy sources such as geothermal, where the source temperature of the steam is typically about 325° F. Still, it should be understood that the invention is not limited to any specific source temperature operating range. Instead, the invention has the potential to increase thermal to power conversion efficiency over a broad range of temperatures.

In FIG. 6, an external source provides 10 units of heat energy ($Q_{in6}$) to the Rankine cycle portion 601 at temperature 500° F. Computer modeling can be used to demonstrate that the Rankine cycle portion in this scenario will have an efficiency of about 12.2% ($\eta$=12.2%). This value represents the efficiency of the Rankine cycle portion 601 prior to the point where it is merged with the Brayton cycle portion 602 (i.e., prior to mixing the working fluids in the mixing chamber 504). The remaining energy that is present in the Rankine cycle is transferred to the Brayton cycle portion 602. Computer modeling shows that the Brayton cycle portion will have an efficiency of 33.2% ($\eta$=33.2%) in this scenario.

Notably, the transfer of energy from the Rankine cycle portion to the Brayton cycle portion makes the efficiency of the Brayton cycle portion appear higher than one skilled in the art would ordinarily expect. This increase in efficiency can be generally attributed to the increased volumetric flow added to the Brayton cycle portion from the Rankine cycle portion. Since the optional first expander is included in the computer modeling for FIG. 6, a portion of the Rankine cycle energy is expended in such first expander 508. If the optional first expander 508 was not included in the model, then the Brayton cycle efficiency could be expected to increase further because more of the energy from the Rankine cycle would be available for use in the Brayton cycle portion.

Of the 10 units of heat energy that are put into the system in FIG. 6, there are 1.22 units of work energy ($W_{out6a}$) extracted in the Rankine cycle portion 601. Due to the effect of the mixing chamber contained in the imbedded cycle portion, there are 8.78 units of rejected heat transferred from the Rankine cycle portion 601 to the Brayton cycle portion 602. From the 8.78 units of rejected heat that are transferred, the Brayton cycle portion extracts 2.92 units of work ($W_{out6b}$). Finally, 5.86 units of rejected heat are released from the combined system. Of the original 10 units of heat, 4.14 are converted to useful work (1.22+2.92=4.14) and 5.86 units are rejected as waste heat. Using typical real world components, the system consumes 1.14 units ($W_{in6}$) of the useful work when removing the 5.86 units of rejected heat ($Q_{out6}$) from the condenser. Taking into account the pumping required for cooling, computer modeling shows that a real world efficiency of 30% is achievable for the system shown in FIG. 6. This is the overall system efficiency when a heat source has a temperature of 500° F.

Figure 7:
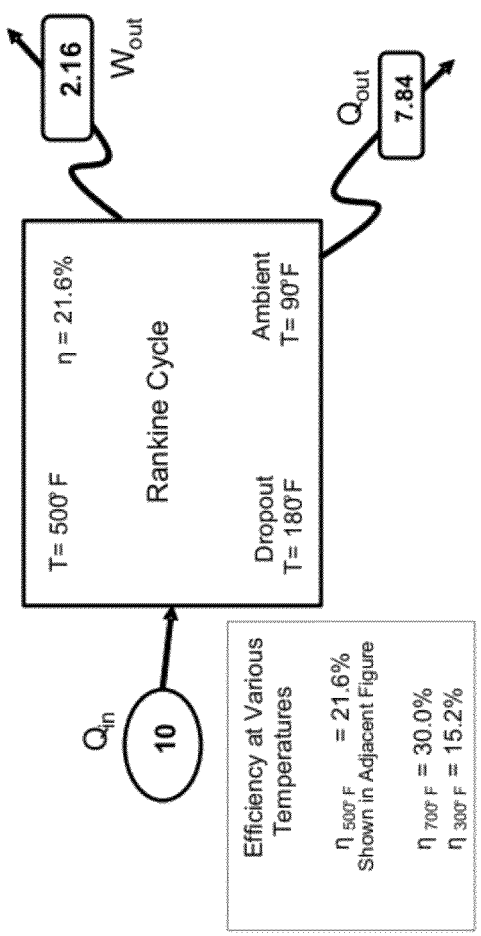
FIG. 7 is a drawing that is useful for comparing an efficiency of the hybrid imbedded combined cycle in FIG. 6 to the efficiency of a Rankine cycle.
Figure 8:
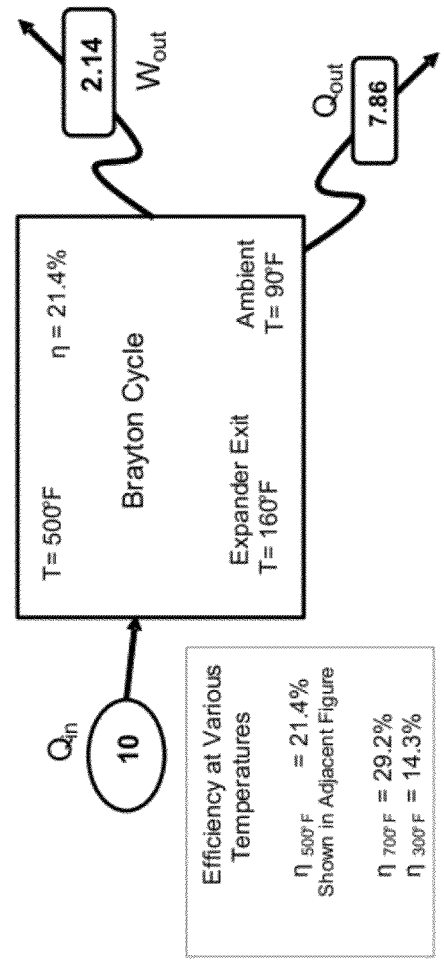
FIG. 8 is a drawing that is useful for comparing an efficiency of the hybrid imbedded combined cycle in FIG. 6 to the efficiency of a Brayton cycle.

The level of efficiency achieved in FIG. 6 represents a substantial improvement relative to results achievable with conventional cycles operating at equivalent temperatures using conventional hardware. This point can be best understood by comparing the results in FIG. 6 to the conventional Rankine and Brayton cycles represented in FIGS. 7 and 8. As illustrated in FIG. 7, the efficiency of a conventional Rankine cycle operating at the same temperature range (T=500° F.) will typically be only about 21.6%. Similarly, a conventional Brayton cycle operating at the same temperature range will typically have an efficiency of only about 21.4%. Accordingly, the 30% efficiency achievable with the method/system described with respect to FIGS. 4-6 is a significant improvement over a conventional Rankine cycle or conventional Brayton cycle, where all comparative calculations are based on nominal hardware performance. As shown in FIG. 6, similar improvements in efficiency can be realized at other temperatures. With a source reference temperature of 700° F., efficiency is estimated at 38.5%. With a source reference temperature of 300° F., efficiency is estimated at 22.7%. These efficiency values also represent favorable improvements over the corresponding values for conventional Rankine or Brayton cycles operating at similar temperatures (see FIGS. 7 and 8).

Figure 9:
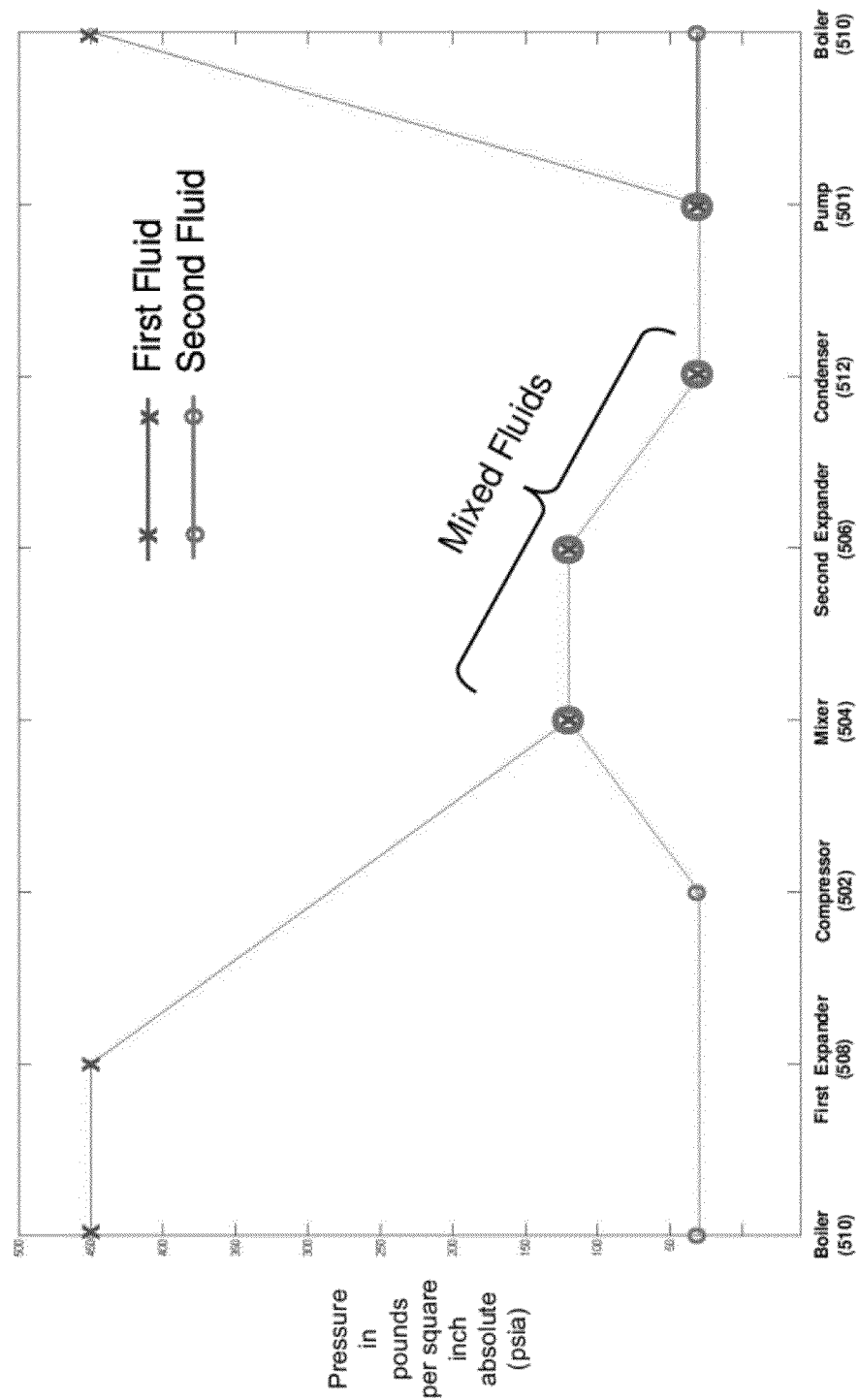
FIG. 9 is a sample pressure profile of the working fluids of the hybrid imbedded combined cycle shown with respect to various stations of FIG. 5.

Referring now to FIG. 9, there is provided a sample state diagram, which shows pressure vs. location within the system 500. The pressures are shown relative to location within the cycle and relative to working fluid type. In FIG. 9, the overlap of the lines representing the Brayton cycle pressure and Rankine cycle pressure represent the imbedded portion of the cycle. Note that the first and second working fluid are in a mixed state during this portion of the cycle. Also note that pressure in FIG. 9 is represented as pressure in pounds per square inch absolute (psia).

Figure 10:
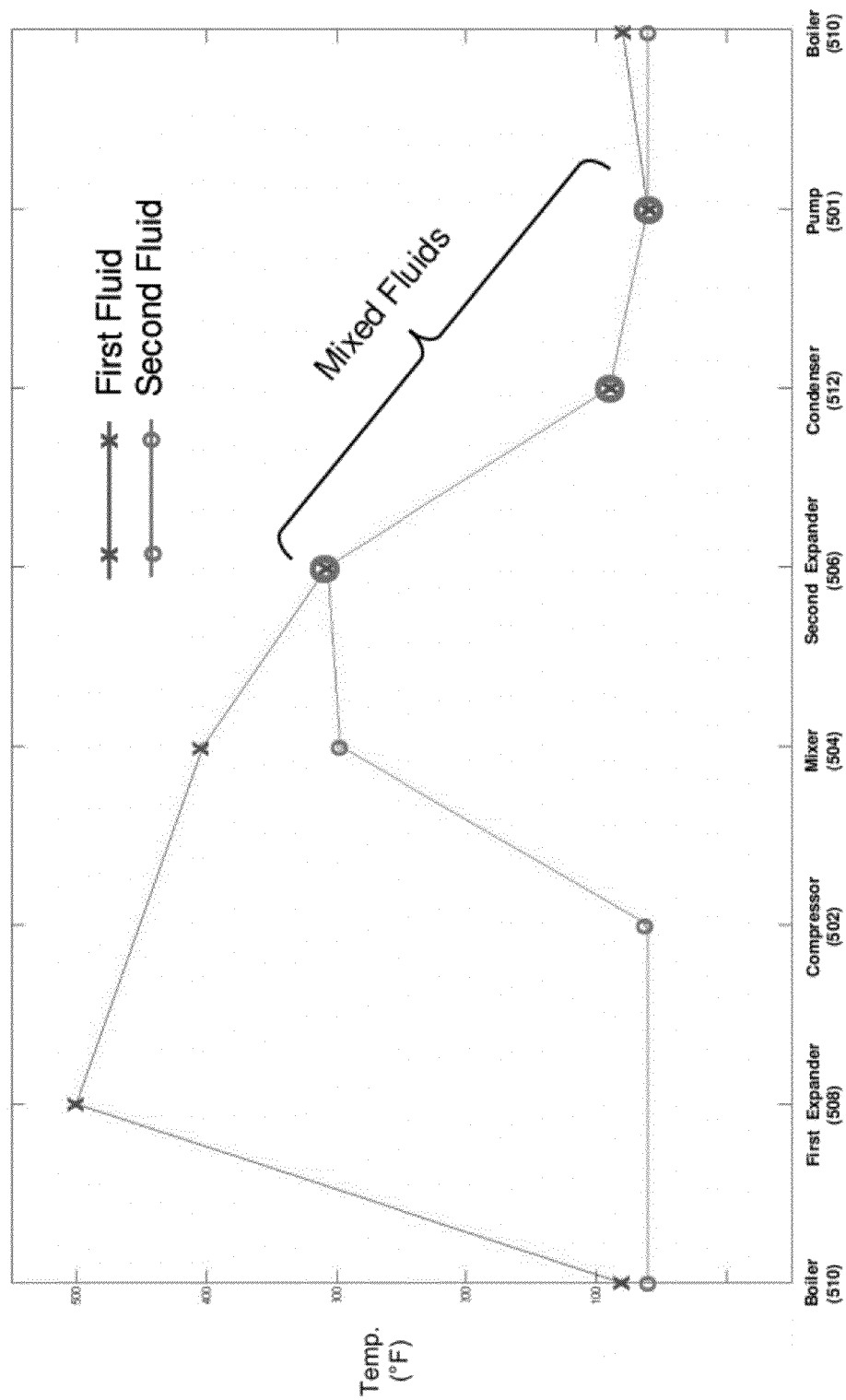
FIG. 10 is a sample temperature profile of the working fluids of the hybrid imbedded combined cycle shown with respect to the various stations of FIG. 5.

FIG. 10 is a sample state diagram which shows temperature versus location within the system 500. The temperatures are shown relative to location within the cycle and relative to fluid type. The overlap represents the imbedded portion of the cycle. In FIG. 10, the overlap of the lines representing the Brayton cycle pressure and Rankine cycle pressure represent the imbedded portion of the cycle. Those skilled in the art will appreciate that the pressures and temperatures in FIGS. 9 and 10 are merely provided for purposes of example, and the invention is not intended to be limited with regard to the values shown.

In an alternative embodiment of the invention, efficiency of the cycle can be further improved by using the working fluids themselves for cooling purposes internal to the cycle process. This enables a portion of the normally rejected thermal energy (traditionally removed by the condenser) to be reintroduced within the cycle, at a location where it is capable of being used to perform work. This iterative approach to reutilization of available thermal energy within the cycle further contributes to overall efficiency gains. One embodiment of such an approach is described with respect to FIGS. 11 and 12. However, it should be understood that the invention is not intended to be limited in this regard; instead, other appropriately arranged cooling methods can also be used as may be known now or in the future by those skilled in the art. All that is necessary is that the first or second working fluid be used internally within the cycle to also perform a cooling or refrigeration function.

Figure 11:
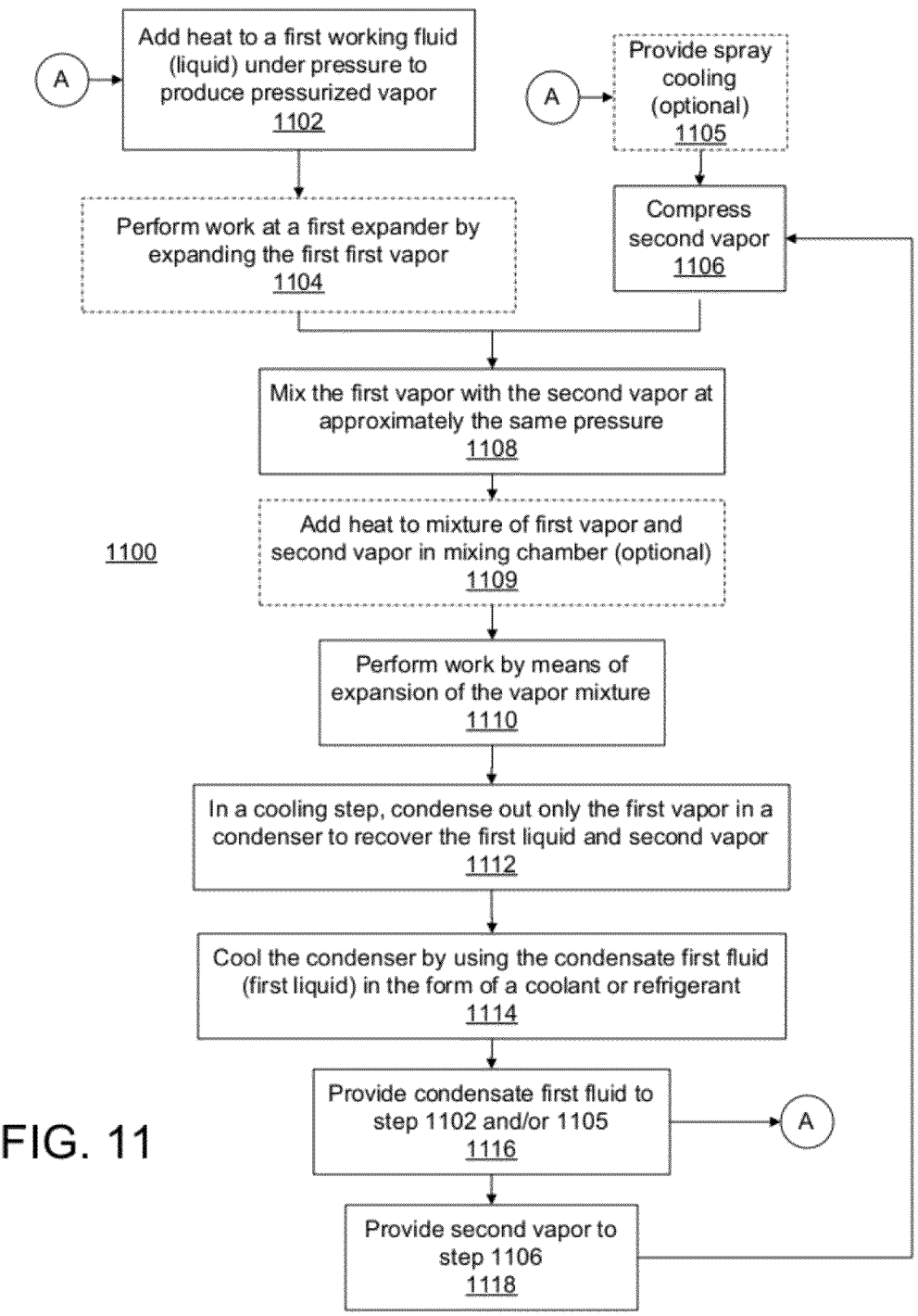
FIG. 11 is a flow chart that is useful for understanding an alternative embodiment of a hybrid imbedded combined cycle which includes an integrated cooling cycle.
Figure 12:
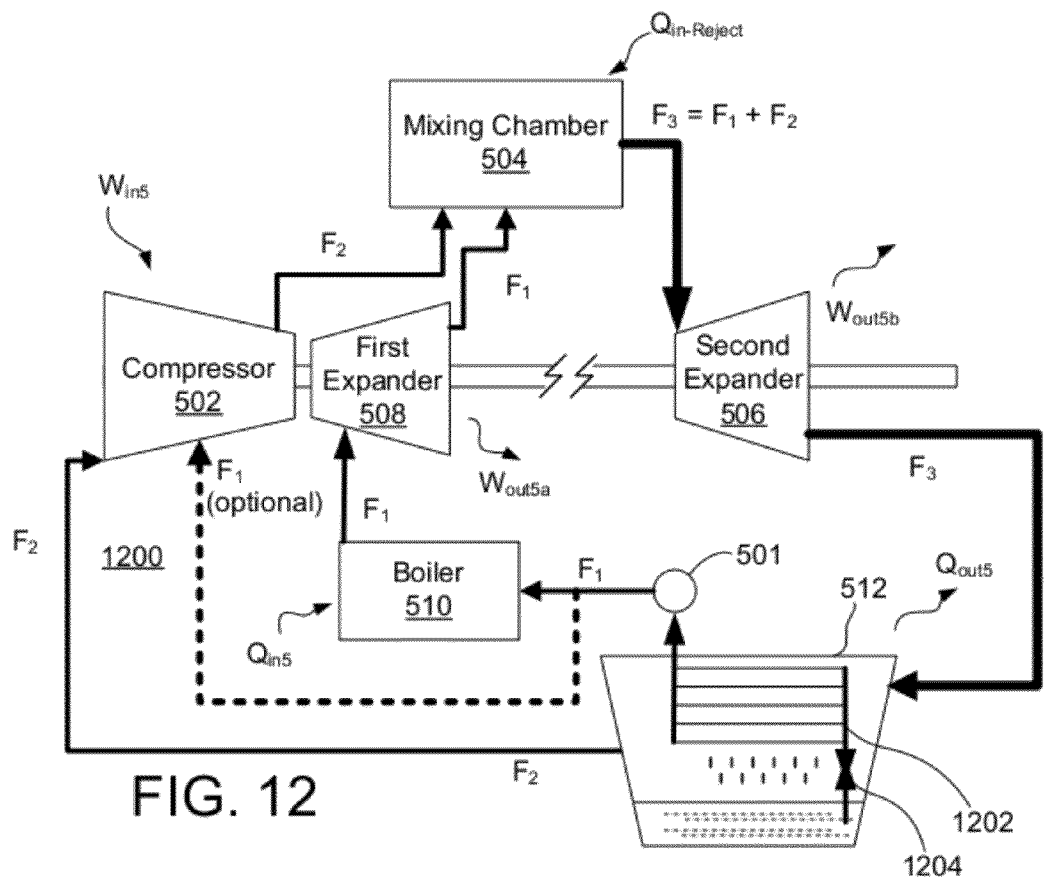
FIG. 12 is a drawing that is useful for understanding an apparatus configured for implementing the hybrid imbedded combined cycle in FIG. 11.

The embodiment shown in FIGS. 11 and 12 combines aspects of a Rankine cycle, aspects of a closed Brayton cycle, and a refrigeration cycle that shares the working fluid associated with the Rankine cycle and Brayton cycle. The Rankine, Brayton and refrigeration cycles are efficiently imbedded or merged within varying portions of the overall cycle, to increase the thermal conversion efficiency as compared to the embodiments described with respect to FIGS. 4 and 5. The method enables the removal of heat (thermal energy) from the condenser and allows such heat to be advantageously added back to the Rankine cycle, and later to the Brayton cycle flow. The embodiments described in FIGS. 11 and 12 also reduce thermal energy that is rejected to the atmosphere.

Referring now to FIG. 11 there is provided a flowchart that is useful for understanding the alternative embodiment of the invention. The method 1100 can begin with step 1102 where heat is added to a first fluid (liquid) under set pressure; for example, this step can be performed in a boiler. The heating of the first working fluid produces a pressurized vapor (first vapor). In step 1104, work is optionally performed in a first expander by expanding the first vapor. As previously explained with respect to FIGS. 4 and 5, inclusion of this expansion step can be omitted in some applications without significant loss of overall system efficiency.

Concurrent with steps 1102 and 1104, a second vapor is compressed in step 1106. Prior to or during this compressing step, a liquid spray can be added to the second vapor in step 1105. In some embodiments, the liquid spray can be comprised of the first working fluid. The addition of the liquid spray can advantageously perform a cooling function. This cooling operation will be described in further detail as the discussion progresses. In step 1108, the first vapor is mixed with the second vapor at approximately the same pressure. Notably, while mixing at the same pressure is presently a preferred embodiment, the invention is not limited to this approach. There may arise advantages to mixing at varied pressures under certain conditions of operation and the invention is intended to include such alternative embodiments. In step 1109 additional heat from an external source can optionally be added to the vapor mixture of step 1108. In step 1110, work is performed by means of expansion of the vapor mixture. The expansion of the vapor mixture is facilitated by providing a pressure drop across a second expansion device. In step 1112, the first vapor is condensed in a condenser to recover the first liquid. The second vapor is permitted to remain in a vapor state.

In step 1114, the condenser is cooled by using the condensate first fluid as a coolant (or refrigerant). Step 1114 will be explained in further detail as the discussion progresses. In step 1116, the condensate first fluid is provided to step 1102 where heat is once again added to the first fluid under pressure (e.g in a boiler). In step 1116, the condensate first fluid can optionally also be provided for use in step 1105. In step 1118 the second vapor is provided to step 1106 where the second vapor is again compressed. This compressing step further cools the condenser by lowering a second vapor pressure on the low pressure side of the compressor. The compressed second vapor is then provided at step 1108 at the established mixing temperature and pressure so the process can be repeated.

The method disclosed in FIG. 11 will now be described in further detail with reference to FIG. 12 which discloses a heat engine 1200 which is capable of implementing the method in FIG. 11. Those skilled in the art will appreciate that heat engine 1200 is merely one possible arrangement for implementation of the method disclosed in FIG. 11, and the invention is not intended to be limited in this regard. The heat engine 1200 includes many of the same components which operate in substantially the same way as in FIG. 5. However, with heat engine 1200, the first working fluid is used as a refrigerant (or in the capacity of a refrigerant) within an evaporator 1202 to implement a refrigeration cycle portion.

In an embodiment of the invention, one or more expansion valves or throttles 1204 can be used to effect evaporation of the first working fluid. This is accomplished by converting the first working fluid (in liquid form) to a vapor as the first working fluid is drawn through an expansion valve 1204 or any other suitable vaporization environment. As will be understood by those skilled in the art, the transition of the first working fluid to a vapor state provides the potential to reduce the temperature when lowering the pressure and effecting evaporation, thereby lowering the temperature of the first working fluid. This reduction in temperature allows the first working fluid to then draw heat from the third working fluid (in vaporous state) which surrounds the evaporator 1202.

Expansion valves and other types of vaporization means are well known in the art and therefore will not be described here in detail. However, it should be understood that the first working fluid $F_1$ in the form of liquid condensate at pressure p1 in the condenser, is advantageously vaporized within expansion coils (or a similar vaporization environment) of evaporator 1202. The pressure within the expansion coils is at a lower pressure than the environment within the condenser 512. This lower pressure is facilitated by use of pump 501. In particular, the pump is capable of drawing at least a portion of the liquid $F_1$ to vapor within the evaporator 1202 by means of the expansion valve (choke or throttle valve) 1204. The heat (thermal energy) which is extracted out of the condenser 512 is pumped back into the Rankine cycle portion. Note that a certain portion of the heat associated with the vapor mixture supplied to the condenser may be lost to the atmosphere; in FIG. 12, this heat is identified as $Q_{out5}$.

Components in FIG. 12 comprising the Rankine cycle portion include pump 501, boiler 510, and first expander 508. The thermal energy extracted in the refrigeration cycle portion can be used later in both the Rankine and Brayton cycle portions to perform work (create power). The use of the working fluids to implement a refrigeration cycle within this imbedded cycle format as described above is new. Still, it may be noted that the resulting effect on the heat cycle is similar to the principle of feed water heating. In this case the heat is extracted from within the cycle more efficiently by lowering the temperature of $F_1$ in the evaporator. In contrast traditional feed water heaters rely on simple heat exchanger conduction to extract heat from external portions of the cycle. Consequently instead of simply removing excess heat to the atmosphere (as is done in FIGS. 4-6), the pump 501 allows the heat from the condenser to be re-used within the system, where the working fluid $F_1$ from the condenser 512 is provided to the boiler 510 at an elevated temperature (i.e. at a temperature above the condensate temperature within the condenser).

After absorbing heat at low pressure on the low pressure side of pump 501, the first working fluid is further heated prior to entering boiler 510. This heating occurs under elevated pressure on the high pressure (p High) side of heat pump 501, where the $F_1$ vapor portion is forced back to liquid form under the higher pressure of the pump. Within the boiler 510, and at the elevated pressure (p High), thermal energy ($Q_{in5}$) is added to the first working fluid. The temperatures, pressures, and flow rates of the overall cycle are chosen (defined), to allow the conversion of the first working fluid in liquid form to again transition to vapor form. According to an embodiment of the invention, the latent heat of vaporization is the means by which heat energy of $Q_{in5}$ is dominantly absorbed into the fluid. Further heating of the fluid in the vapor state can also be performed, as is well known to those skilled in the art. After the first working fluid (first vapor) is heated in boiler 510, it is communicated to the first expander 508 as a vapor, where it performs useful work. The first working fluid is thereafter mixed with the second working fluid in mixing chamber 504 to form the third working fluid. The third working fluid is then used to produce useful work in the second expander 506. The third working fluid is thereafter communicated to the condenser 512 where the process is repeated.

The embodiment of the invention shown in FIGS. 11 and 12 offers several advantages over the embodiment shown in FIGS. 4-6. For example, the embodiment shown in FIGS. 11 and 12 advantageously permits the condenser 512 to become colder, while at the same time requiring less thermal energy from the boiler 510. Computer modeling shows that in the embodiment described with respect to FIG. 12, approximately three (3.0) times more thermal energy could be transferred from condenser 512 to boiler 510 as compared to the energy required to operate pump 501. This estimate is based on the coefficient of performance (CoP) that might be achieved in the cycle by using commercially mature heat pump technology 501. However, it is recognized that the first working fluid may not perform as well as an ideal refrigerant in some cases, therefore resulting in a lower coefficient of performance.

From the foregoing, it will be understood that the heat engine 1200 uses the coefficient of performance (CoP) of the first working fluid to satisfy a portion of the cooling needs of the condenser 512 (heat removal from the third working fluid), and reissues the thermal energy to the boiler 510. After performing work in the first expander, the first working fluid is mixed with the second working fluid in mixing chamber 504. Consequently, the rejected heat from the Rankine cycle portion ($Q_{in-Reject}$) can be used in the Brayton cycle portion to heat the second working fluid in the mixing chamber 504, and later in the expander 506. The rejected heat from the Brayton cycle portion which contains an imbedded portion of the Rankine cycle portion, is taken out in the condenser 512, and the overall cycle repeats itself.

The foregoing description provides one possible method by which the first working fluid can be cooled, and used to absorb heat from the second working fluid. However, it should be appreciated that the invention is not limited to the particular methods described herein for cooling the working fluids in the condenser 512. Instead, other suitable methods known now or in the future can be used for this purpose. All that is required is that, as part of the cycle, the first working fluid is used as a coolant or refrigerant to provide a mechanism for transferring heat as part of the process. An example of this will be further discussed in relation to FIG. 17.

FIG. 13 is a drawing that is useful for understanding the efficiency of the cycle described above with respect to FIGS. 11 and 12. The Rankine cycle portion 1301 represents components of the cycle in FIG. 12 including pump 501, boiler 510, first expander 508, and condenser 512. The Brayton cycle portion 1302 represents components in FIG. 12 including compressor 502, mixing chamber 504, expander 506, and condenser 512. The imbedded cycle portion 1304 is shown as overlaying blocks 1301 and 1302 since the imbedded cycle portion actually incorporates portions of the Rankine cycle portion and the Brayton cycle portion. The imbedded cycle portion 1304 represents components of the cycle in FIG. 12 including mixing chamber 504, the second expander 506, the condenser 512 and the throttle 1204. The refrigeration cycle portion 1303 that is contained within the imbedded cycle portion represents components of the refrigeration system in FIG. 12 including pump 501, evaporator 1202 and one or more expansion valves 1204.

For purposes of this example, we assume that a liquid spray comprising the first working fluid $F_1$ is added to the second working fluid $F_2$ before or during the compression of the second working fluid in compressor 502. The liquid spray performs a cooling function by vaporizing and thereby absorbing heat from the second working fluid during compression. Additional detail concerning the system modeled in FIG. 13 is provided with respect FIGS. 18A and 18B. As illustrated therein, this computer model uses Pentane as the first working fluid. The second working fluid is a mixture of Pentane, Helium, and Nitrogen. The temperature, pressure, and mass flow rates of the first and second working fluid are provided in FIG. 18A and B relative to the locations of the various system components in FIG. 13. Still, it should be appreciated that the invention is not limited to these working fluids and/or to the temperatures, pressures and/or mass flow rates that are stated in this example.

In FIG. 13, it is assumed that an external source provides 10 units of heat energy ($Q_{in13}$) to the Rankine cycle portion 1301. In this example, the 10 units of heat energy are provided at temperature 500° F. Also, for purposes of simplicity, no additional heat is added to the working fluids in the mixing chamber 504 (i.e., optional step 1109 is omitted). Computer modeling is used to determine practical cycle efficiency. In addition to the heat energy $Q_{in13}$ supplied from the external source, an additional 6 units of energy are recovered from the refrigeration cycle 1303. This combined 16 units of heat energy is provided to the Rankine cycle portion 1301. Within the Rankine cycle portion, there are 1.95 units ($W_{out13a}$) of work energy extracted. There are 14.05 units of rejected heat transferred from the Rankine cycle portion 1301 to the Brayton cycle portion 1302. From this 14.05 units of transferred heat energy, the Brayton cycle portion 1302 extracts 4.66 units of work and releases 9.39 units of rejected heat. Of this 9.39 units, there are 6 units that are transferred to the refrigeration cycle 1303, and 3.39 units which are rejected to the atmosphere from the condenser 512 as waste heat $Q_{out13}$. Using estimated component performance based on current technology, the system consumes 2.00 units ($W_{in13}$) of useful work when extracting the 6.00 units of rejected heat ($Q_{return}$) from the condenser during the refrigeration cycle.

When the scenario of FIG. 13 is considered as a whole, one can observe that only 10 units of heat are provided by an outside source, and 4.61 units of energy are ultimately converted to useful work after we account for the additional energy required to perform the refrigeration process. The foregoing statement can be summarized as 1.95+4.66−2.00=4.61. Ultimately, only 3.39 units of energy are rejected as waste heat, giving an overall cycle efficiency of 46.1%. This level of efficiency represents a significant improvement relative to results achievable with conventional cycles operating at equivalent temperatures. While FIG. 13 represents a basic pictorial that is useful for understanding the overall cycle, it should be noted that system thermal and mechanical losses are accounted for and are reflected in further detail in the table shown in FIGS. 18A & 18B.

Figure 14:
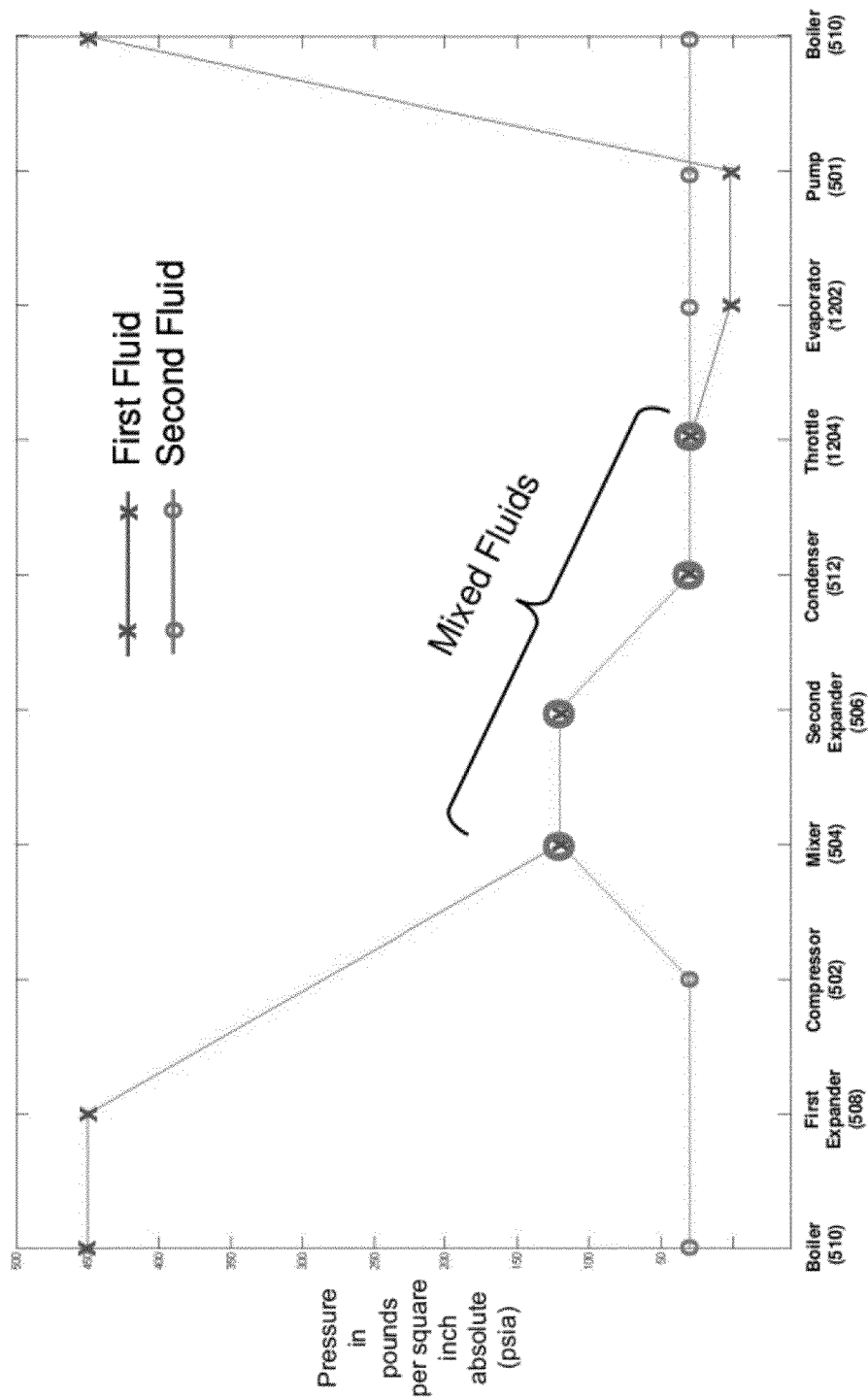
FIG. 14 is a sample pressure profile of the working fluids of the hybrid imbedded combined cycle shown with respect to various stations of FIG. 12.
Figure 15:
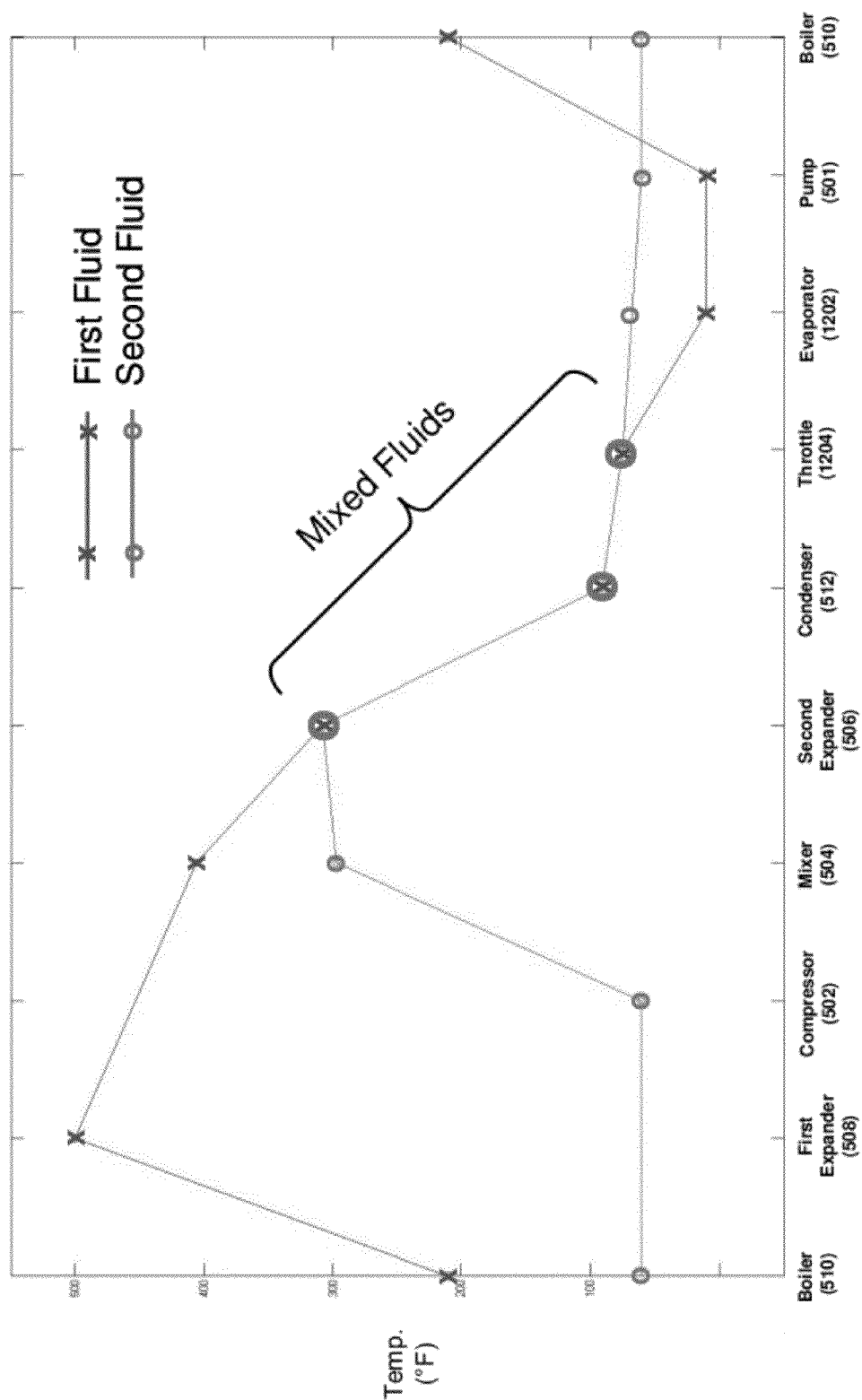
FIG. 15 is a sample temperature profile of the working fluids of the hybrid imbedded combined cycle shown with respect to the various stations of FIG. 12.

Referring now to FIG. 14, there is provided a sample state diagram which shows pressure vs. location within the system 1200. The pressures are shown relative to location within the cycle and relative to fluid type. FIG. 15 is a sample performance overview which shows temperature versus location within the system 1200. The temperatures are shown relative to location within the cycle and relative to fluid type. In FIGS. 14 and 15, the overlap of the lines representing the Brayton cycle and Rankine cycle represent the imbedded portion of the cycle. Those skilled in the art will appreciate that the pressures and temperatures in FIGS. 14 and 15 are merely provided for purposes of example, and the invention is not intended to be limited with regard to the values shown.

Figure 16:
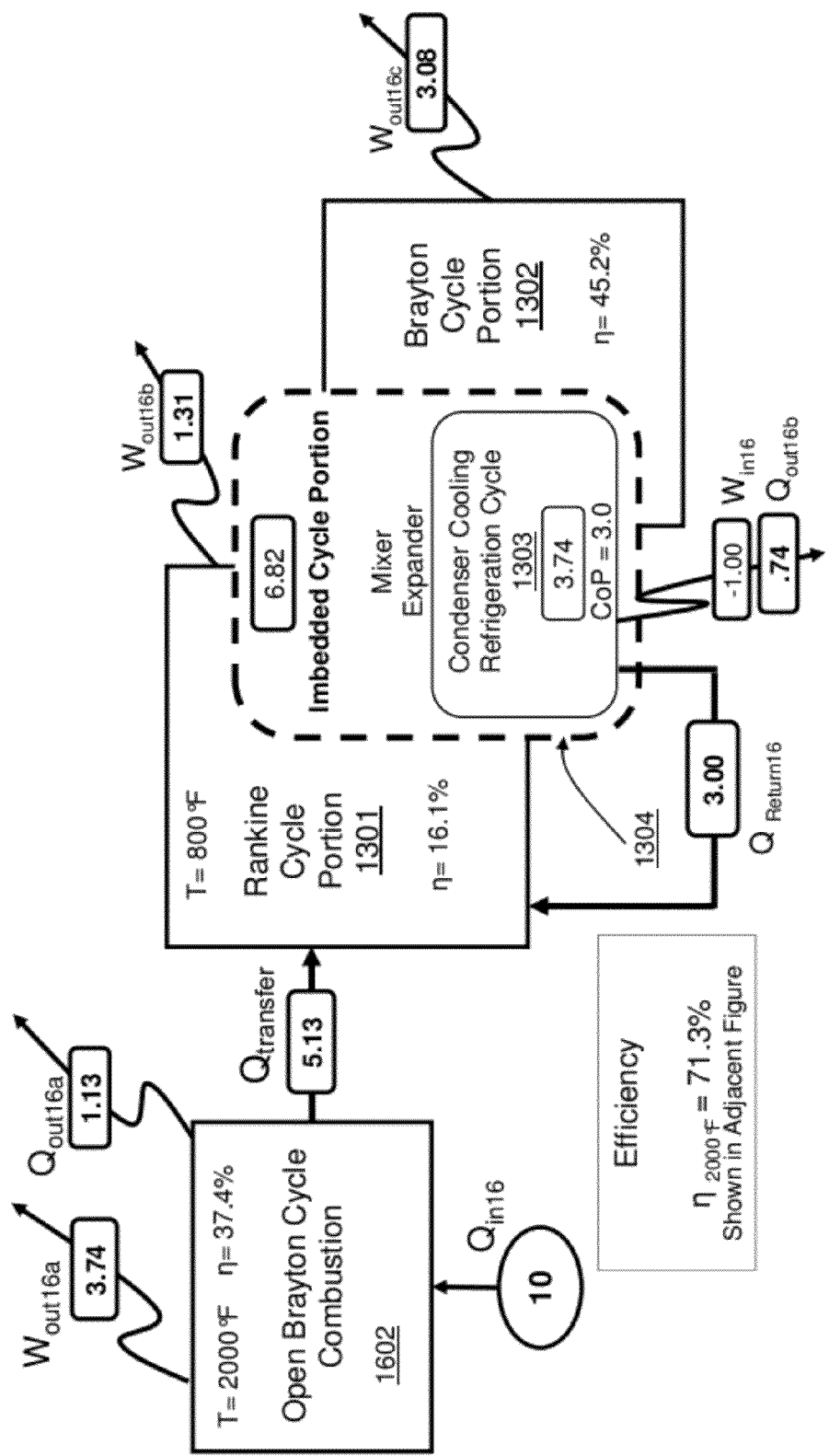
FIG. 16 shows an embodiment in which the high temperature source for the Rankine cycle portion in FIG. 12 is supplied from an open Brayton cycle combustion, such as a gas turbine.

In some embodiments, the cycles and systems described in FIGS. 4-15 can be combined with other thermodynamic cycles. Such combinations can result in efficiencies that are even higher than those stated with respect to FIGS. 4-15. For example, FIG. 16 shows an example which incorporates the cycle in FIG. 12 in a system where the high temperature source for the Rankine cycle portion 1301 is supplied from an open Brayton cycle combustion, such as a gas turbine. Here, the open Brayton cycle combustion system 1602 operates at a relatively high temperature of about 2000° F. In this model, 10 units of heat energy ($Q_{in16}$) are input to the system. The open Brayton cycle combustion extracts from the 10 units of heat energy 3.74 units of work ($W_{out16a}$), and produces 1.13 units of waste heat ($Q_{out16a}$) from that cycle. The remaining 5.13 units of rejected heat energy ($Q_{transfer}$) from the open Brayton cycle 1602 is transferred to the Rankine cycle 1301 such that the Rankine cycle operates at about 800° F. In other respects, the arrangement in FIG. 16 is similar to that described in FIG. 11-13.

In addition to the heat energy $Q_{transfer}$ supplied from the open Brayton cycle in FIG. 16, an additional 3 units of energy are recovered from the refrigeration cycle 1303. This combined 8.13 units of heat energy is provided to the Rankine cycle portion 1301. Within the Rankine cycle portion, there are 1.31 units ($W_{out16b}$) of work energy extracted. There are 6.82 units of rejected heat transferred from the Rankine cycle portion 1301 to the Brayton cycle portion 1302. From this 6.82 units of transferred heat energy, the Brayton cycle portion 1302 extracts 3.08 units of work ($W_{out16c}$) and releases 3.74 units of rejected heat. Of this 3.74 units, there are 3 units ($Q_{Return16}$) (0 that are transferred to the refrigeration cycle 1303, and 0.74 units ($Q_{out16b}$) which are rejected to the atmosphere directly from the condenser 512 as waste heat. Using estimated component performance based on current technology, the system consumes 1.00 unit ($W_{in16}$) of useful work when extracting the 3.00 units of rejected heat ($Q_{Return16}$) from the condenser during the refrigeration cycle.

When the scenario of FIG. 16 is considered as a whole, one can observe that only 10 units of heat are provided by an outside source, and 7.13 units of energy are ultimately converted to useful work after we account for the additional energy required to perform the refrigeration process. The foregoing statement can be summarized as 3.74+1.31+3.08−1.00=7.13. Ultimately, only 1.87 units of energy are rejected as waste heat, giving an overall cycle efficiency of 71.3%. With the arrangement illustrated in FIG. 16, computer modeling shows that the efficiency of the system would be about 71.3%. This relatively high efficiency value demonstrates the potential for a noticeable improvement relative to results achievable with conventional combined cycles operating at similar source temperatures.

In FIGS. 11 and 12, the refrigeration cycle uses the $F_1$ fluid as an effective refrigerant to acquire heat from the third working fluid $F_3$ within the condenser 512. According to an embodiment of the invention the evaporator 1202 could optionally be disposed at a location where the first working fluid ($F_1$), acting as a refrigerant, could absorb heat from other heat sources. Such other heat sources could be an alternative or in addition to the heat available within the condenser. If such other heat sources are used, they can comprise a second and/or third heat source. If the second and/or third heat source is used in conjunction with the heat available within the condenser 512, then the evaporator 1202 could advantageously reside partially within the condenser and partially external to the condenser. With such an arrangement, the evaporator 1202 could be available to absorb heat from condenser 512 and the second and/or third heat source. Those skilled in the art will appreciate that absorption of heat from such other sources can occur before, after or concurrent with the absorption of heat from the condenser 512. The second or third heat source(s) can include components associated with any other portion of the cycle described in FIGS. 11 and 12 where waste heat is expended from the cycle. For example, such rejected or waste heat may be present at the return line of a geothermal well. A system which illustrates such an arrangement is shown in FIG. 17.

Steam from a geothermal well typically rises up from the ground at a temperature of approximately 325° F. Consider a system where the first working fluid is comprised of pentane, and where the boiler has an operating pressure of 60 psia, an inlet temperature of 160° F., and an exit temperature of about 280° F. In such a system, the pentane used in the Rankine portion of the cycle can only absorb heat that is above approximately 160° F. (since that is the inlet temperature of the boiler 510 in this scenario). The transition point where the pentane turns to vapor at 60 psia is 185° F. This ultimately means that the water returning to the geothermal well has a temperature of about 160° F. (i.e., it contains significant amounts of thermal energy).

Figure 17:
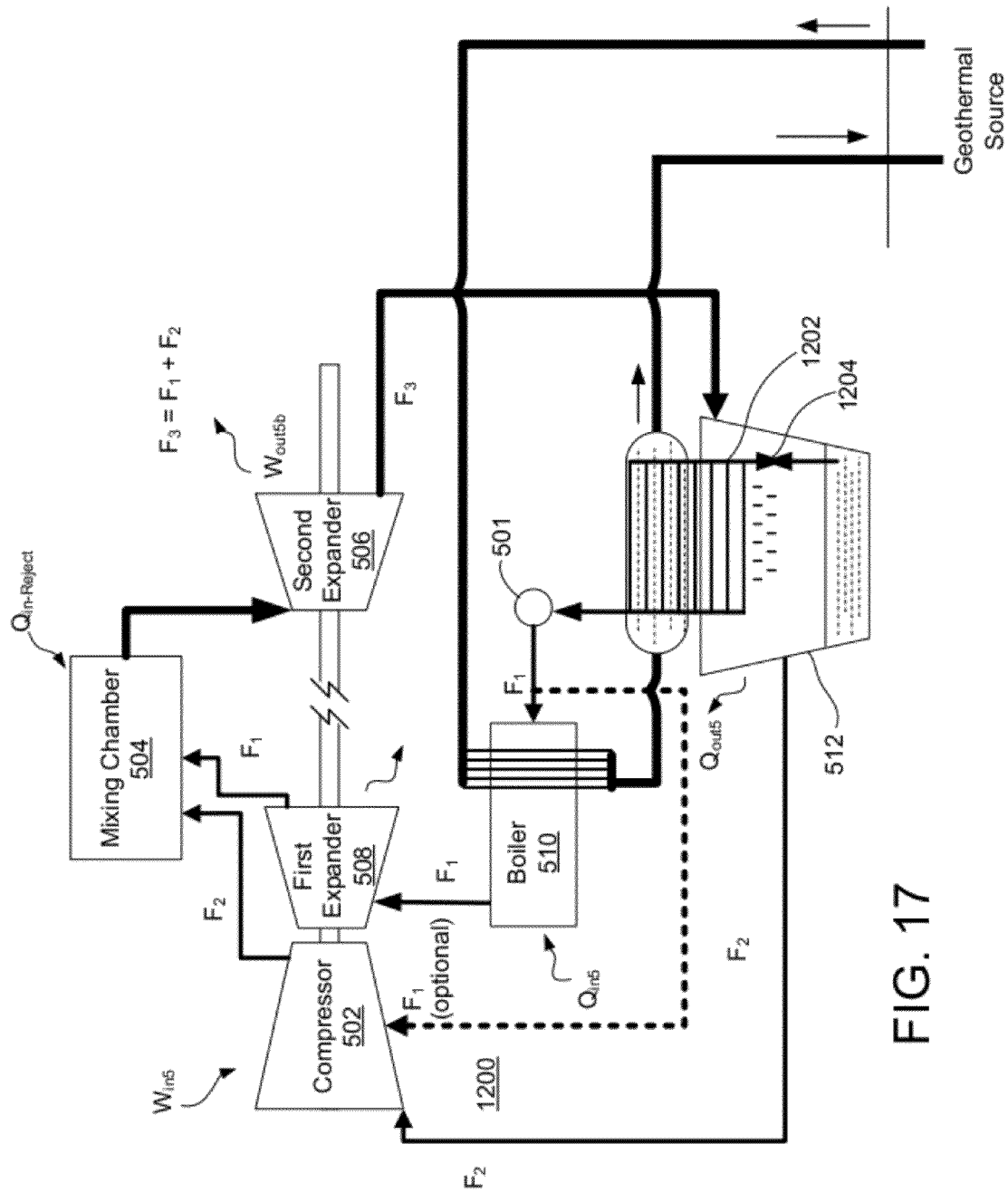
FIG. 17 is an alternative embodiment of the apparatus shown in FIG. 12.

In the foregoing example, assume that the evaporator 1202 (or a portion thereof) was located in or adjacent to the return line of the geothermal well (or in a heat exchanger thereof) as shown in FIG. 17. In such an embodiment, the pentane (first working fluid functioning as refrigerant within the evaporator 1202) could absorb the thermal energy from this source of heat. In fact, the evaporator could absorb such thermal energy from the geothermal return line more readily compared to absorbing heat from within the condenser 512. This is because the return line temperature of the geothermal well is about 160° F., whereas the temperature of the third working fluid in the condenser is only about 90° F. in this scenario. Ultimately, this would mean that the CoP (coefficient of performance) for the system in FIGS. 11 and 12 can be further increased if the evaporator 1202 is arranged to absorb heat from a return line of a geothermal well. With an arrangement as described herein, the geothermal return line could ultimately have a temperature of about 120° F. (rather than the previous 160° F.). This difference in temperature represents a significant amount of thermal energy that can be used in the cycle rather than being returned to the ground.

From the foregoing it will be understood that the integrated refrigeration cycle of the present invention has many advantages, particularly when used to absorb available energy from waste heat. Conventional system absent such refrigeration cycle have far less capacity to use such waste heat because the temperature differentials are generally too small to provide a benefit.

The cooled first working fluid $F_1$ that is produced in the refrigeration cycle can also have other uses. In some embodiments, the cooled first working fluid can be used for cooling the surfaces of the condenser 512 and/or can be used for directly cooling the third working fluid. In another embodiment, not shown, the cooled first working fluid within the environment of the evaporator can be used to further cool a portion of the $F_1$ condensate within the condenser. This can be accomplished by submerging a portion of the evaporator into the liquid condensate. The cooled condensate could thereafter be advantageously used as a spray in providing direct cooling of the incoming third working fluid. Overall, the mechanical work of pump 501 is used to supply the first working fluid to the boiler 510 at an elevated temperature while also causing a reduction in the temperature of the first working fluid within the thermal environment of the evaporator 1202. In this regard, pump 501 operates essentially in the mode of a refrigerant pump or as a heat pump. The cooled working fluid $F_1$ can then be used to more efficiently absorb heat from the third working fluid $F_3$ within the condenser, or from other waste heat sources (e.g. a geothermal return line) as described above.

Those skilled in the art will appreciate that overall system performance of the various embodiments will naturally be governed by a variety of different variables. For example, such variables can include, without limitation:
(1) the chemical properties of the first working fluid $F_1$;
(2) the chemical properties of the second working fluid $F_2$;
(3) the mass flow rate of the first working fluid $F_1$;
(4) the mass flow rate of the second working fluid $F_2$;
(5) temperature at each point in the cycle;
(6) pressure at each point in the cycle;
(7) density/volume at each point in the cycle;
(8) enthalpy of each fluid and mixed fluid states;
(9) the ratio of specific heat ($C_p/C_v$) of each fluid and mixed fluid states.

In general, the cycle described in FIGS. 4-16 will be configured based on the nature or type of thermal source available for providing thermal energy. From there, appropriate fluids are selected and modeled using computer simulation tools. The operation and control of the cycle is then fine tuned around desired control points of temperature and pressure within the apparatus of the system configuration chosen. These temperatures and pressures are dominantly controlled by altering the fluid flow rates of the individual working fluids of certain fluid combinations at select points within the cycle.

In the inventions described with respect to FIGS. 4-16, the mixing ratio of the first and second working fluids in the mixing chamber can be either static or dynamic. Static fluid mixing involves mixing the first and second working fluids in the mixing chamber 504 at a fixed rate. In other words, a fixed mass flow rate is used for each working fluid under set conditions of temperature and pressure. In such an embodiment, the dynamics of each working fluid remains at a near steady state, with the input thermal energy set at a near constant rate, and a constant or substantially constant output (shaft mechanical energy).

In contrast, dynamic fluid mixing involves mixing of the first and second working fluids in the mixer/heat transfer chamber 504 at variable rates. For example, such dynamic mixing might be implemented for purposes of controlling the operational dynamics of such an engine system. In such a dynamic fluid mixing implementation, the state conditions of temperature, pressure, and mass flow for each working fluid may be fluctuating dynamically as a function of fluctuations or changes within the operating cycle. In those instances where the input (thermal) energy is being changed in conjunction with load levels (i.e. power output levels), it can be more appropriate in some embodiments to change the relative mass flow rates of the constituent first and second working fluids rather than changing the gross overall flow rate as a set mixture (or fixed mixture ratio). Still, the invention is not limited in this regard, and the gross overall flow rate can be changed with a fixed mixture ratio. Alternatively, the mixture ratio and the overall flow rate can be changed.

Dynamic control of the mixing ratios can be controlled by any suitable means. In a preferred embodiment, the flow rate of $F_1$ is controlled by the pump rate or pump speed 501, and the flow rate of $F_2$ is controlled by bleeding vapor from the condenser or adding it to the line leaving the condenser. Additionally, $F_2$ can be controlled by altering the speed of the compressor 502. Alternatively, a mixing ratio control system can include one or more control valves 520, 522 for selectively varying a mass flow rate of the first working fluid and/or the second working fluid. By varying the flow rate of one or both of these working fluids, the ratio of the first working fluid and the second working fluid will be varied within the heat transfer chamber. Those skilled in the art will appreciate that locations of valves and preferred ranges of mixing ratios under various conditions will depend on a variety of system specific considerations. These can include the chemicals comprising the first and second working fluids. The third working fluid comprising mixed first and second fluids would be configured on a system specific basis based on heat rates, temperature, pressure and chemical properties of the fluids and fluid combinations.

In very general terms, the ratio of first working fluid to second working fluid would be about 1/3 (one-third) to 2/3 (two-thirds) in an embodiment of the invention. The ratios may in various embodiments also extend over a range. The range can extend from a first arrangement having 1/5 first working fluid to 4/5 second working fluid, to a second arrangement having 2/3 first working fluid and 1/3 second working fluid. Still, the invention is not limited in this regard. As previously noted, it is possible in the extreme case to operate the system using only one fluid composition. In this case a single working fluid is configured to operate both as the first working fluid and the second working fluid. In such an embodiment, the invention relies on carefully managing the liquid to vapor transition at the different locations within the physical apparatus comprising elements of the system. This would include boiler, expanders, compressors, pumps and condensers.

Fluid selection for operating the configuration of thermodynamic cycles described in FIGS. 4-13 is based on many inter-related factors. The conditions of operating temperature and pressure are important in selection of the chemical makeup of the fluid. It is also desirable to choose a boiling point of the first working fluid which is appropriate relative to the source temperature of available heat. For example, if the source of heat is geothermal with a temperature of 350° F., it is desirable to have a first working fluid that has the capability to absorb heat from the source thru vaporization of the selected working fluid. Consider that the chemical pentane has a known boiling point of 97° F. at atmospheric pressure (14.7 psia). In this operational example the pentane could be pressurized to 120 psia where it then has a boiling point of 240° F. The boiler heat at 350° F. is higher than the boiling point and is therefore capable of causing the pentane to vaporize at elevated pressure. Those skilled in the art would quickly see that if the source temperature were to be much lower or the pressure of the pentane any higher, then the transition would not occur as desired. As such, pentane has the capacity to absorb energy by means of vaporization (boiling) when exposed to a 350° F. thermal resource. The vaporous pressurized pentane in this example would have the capacity to both perform some portion of work and additionally carry thermal potential energy to the second working fluid comprising the Brayton portion of the cycle.

It is further desirable to select the first working fluid so that it can re-condense to liquid in the condenser. For example, propane can be advantageously chosen as a first working fluid in some embodiments since it changes from a liquid to a vapor at lower temperatures than other working fluids, such as pentane (assuming the same operating pressure). Propane has a boiling point of −44° F. at atmospheric pressure. An example of where propane might be a desired working fluid is in a space power application. In such application, radiators may easily achieve very cold temperatures (−100° F.) that are well below those normally found on the earth's surface. Accordingly, it could be advantageous in such situations to use a working fluid like propane to take advantage of its low boiling point.

Fluid choices are also governed by the latent heat capacity of a given working fluid. An understanding of why latent heat capacity is important can be gained by contrasting pentane to water. Converting a pound of pentane to vapor at a given pressure requires about 1/6 (one sixth) the amount of thermal energy as is required to convert the equivalent mass of water. Another way to say this is that for the same thermal energy consumed at an equivalent pressure, about six times more mass of pentane will be converted from liquid to vapor. The pentane having a lower boiling point than water, as an example, has the advantage of being capable of acquiring large quantities of lower temperature thermal energy at the sacrifice of requiring six times as much pentane mass to create a near equivalent volume, assuming the same energy input. Additionally, methanol (boiling at 148° F. at atmospheric pressure) requires about 3 times the energy per pound when compared to pentane, and notably this is about half the amount of energy that is required by water.

Use of some fluids as the first working fluid can also be a disadvantage in the present invention. For example, working fluids with extremely low volumetric expansion potential are not the best choice for use in the present invention. Also, certain fluids that have higher boiling points and good volumetric expansion capabilities may only operate at temperatures that are above the source temperature. Accordingly, such fluids would be ruled out for a lower temperature source, but may perform well for another configuration with a higher temperature thermal source. There may be fluids that that perform well in the Rankine cycle portion of the cycle, but may not perform well in the expansion step associated with the Brayton cycle portion. Accordingly, it is important to select and match the fluid capability with the characteristics of thermal energy source.

The second working fluid functions in two key capacities. First, it is dominantly used as a means to convert a portion of the thermal energy of compression to fluid volume. It does this by using the heat energy, resulting from compression of F2, to convert F1 to a vapor, where the energy given up by F2 is the latent heat of vaporization required to vaporize F1. Additionally it acts as carrier or transport means of the first working fluid. At the point that the first and second working fluids are mixed, the first working fluid is effectively imbedded within the second working fluid. The second working fluid additionally acts as a thermal transfer medium providing the means by which the thermal energy of first fluid is effectively converted to useful work (power) during the expansion process.

The second working fluid is the dominant resource used to create power by performing work in the second expander 506. As such, the second working fluid is desirably a low density vapor or a noble gas, such as helium. Helium is advantageous as it will not combine with, and is easy to separate from the first working fluid. It is also desirable that the second working fluid is chosen so that it does not generally condense out to liquid in the particular application in which it is used. It is notable that if the second working fluid did condense out, then the cycle described in FIGS. 4-13 would dominantly be a Rankine cycle.

In an embodiment of the invention, a second working fluid could be comprised of a mixture of 50% helium and 50% nitrogen. In such an embodiment, the first working fluid could advantageously be selected to be either pentane, or water. The water is preferably used as the first working fluid for operation at higher temperatures (e.g. boiler temperature in the 500° F. to 1200° F.) as compared to the pentane (300° F. to 500° F. range). In another embodiment of the invention, the second working fluid could be comprised of 50% propane and 50% helium. In such an embodiment, the first working fluid could be selected to be pentane. Note that helium is advantageous for use as a constituent of the second working fluid. This is because helium will cool more significantly during expansion and will heat more significantly during compression as compared to a gas such as nitrogen. Still, the invention is not limited to these working fluids, and other appropriately selected working fluids can be used in the present invention.

Those skilled in the art will appreciate that the invention is not limited to the particular working fluids or fluid compositions described herein. Instead, any suitable combination of optimized fluids and/or fluid compositions can be selected for a particular application based on available heat source, temperature differentials between heat sources and fluid vaporization rates, and other similar design considerations. In general, the first and second working fluids should be selected such that they work in concert with one another. In particular, the more rapid cooling of the second fluid (as compared to the first fluid) during the expansion process can facilitate the exchange of energy from the first fluid to the second fluid. This leaves the first fluid very close to the vapor to liquid transition point as it approaches the end of the expansion cycle. As the first working fluid condenses, it is therefore separated from the second working fluid and can be collected in the condenser. This unique fluid capability provides the means to tune the thermal take-up rates (heat addition/vaporization) and additionally the drop-out rates (condensate rates) of the fluids in operation.

As noted above, the present invention advantageously uses at least one of the working fluids to perform a cooling or refrigeration function within the heat cycle described herein. FIGS. 11 and 12 concern one way in which the first working fluid could be used for such cooling function. An alternative for such cooling can involve using a liquid spray fluid to cool the second working fluid in the compressor 502. More particularly, the liquid spray fluid can be added to the second working fluid immediately before or concurrently with compression of the second working fluid in compressor 502. This process is useful for removing a portion of the heat produced by compression of the second working fluid.

In some embodiments it may be advantageous to select the liquid spray fluid to be a unique working fluid that is different from the first and second working fluid. However, in a preferred embodiment, the liquid spray fluid is advantageously selected to be comprised of the first working fluid. Such an arrangement is illustrated in FIG. 5, which shows an optional flow of working fluid $F_1$ from the high pressure side of pump 501, to the compressor 502. Still, the invention is not limited in this regard and other working fluids can also be chosen as the spray fluid where they can be separated in the condensate process.

Notably, the above-described liquid spray techniques can reduce the compressor work required to create a given volume of working fluid at a specified pressure. In particular, a liquid spray introduced into the compressed second working fluid within the compressor 502 can facilitate transfer of thermal energy from the second working fluid to the liquid spray fluid, which has a lower temperature and additional capacity to absorb heat. The transferred thermal energy from the compressed second working fluid provides the latent heat of vaporization energy required for the liquid spray fluid, causing the liquid spray fluid to transition to a vapor. As noted above, the liquid spray can be comprised of the first working fluid. By using this technique, the physical apparatus in FIGS. 5 and 12 can produce a larger volumetric flow of vapor to the mixing chamber 504, without further increasing the compressor temperature, thereby resulting in less required compressor work.

When spray cooling is used, the liquid spray fluid is converted to a vaporous fluid, and therefore is available to perform work. More particularly the mixture of the vaporized spray fluid and second vapor will be available to perform work at the design pressure and at a lower temperature as compared to using the second fluid alone without spray cooling. This naturally assumes that the selected pressures used in the compressor 502 (compression process) are adequate to provide temperatures high enough to cause the liquid to vapor transition of the spray fluid. A key note that is understood in the field of thermodynamic fluid transformation, is that as the pressure increases, so too does the temperature that is required to result in the liquid to vapor transition. It is therefore important to select the chemical comprising the liquid spray fluid such that it has the potential to transition to a vapor under the conditions of temperature and pressure of the compression process selected.

In the embodiments shown in FIGS. 5 and 12, temperature of the first working fluid is generally controlled by selecting the source temperature of the boiler and/or controlling the flow rate of the first working fluid. The pressure of the first working fluid supplied to the boiler 510 is controlled by pump 501. Accordingly, the initial pressure levels in the Rankine cycle portion can be controlled by the pump 501. The same pump or an additional pump may control the vacuum or relatively low pressure provided within the evaporator of 1202 in concert with throttle valve 1204.

In an embodiment of the invention, the first working fluid and second working fluid enter mixing chamber 504 at nearly the same pressure. The pressure of working fluid $F_2$ is generally controlled by the operation of compressor 502. Accordingly, compressor 502 is preferably designed to raise the pressure of the second working fluid $F_2$ to a suitable level for providing a pressurized flow of the second working fluid at approximately the same pressure as the first working fluid. Specific designs of the mixing chamber would allow for or enable deviations in pressures between these fluids, and are intended to be included within the scope of the present invention.

The temperature of the second working fluid exiting the compressor 502 is most appropriately controlled by the mass flow rate and type of liquid spray fluid that is incorporated for a specific design configuration. Increasing the mass flow rate of the liquid spray fluid added to the second working fluid at compressor 502 will act to lower the temperature of the combined fluids. The limit of this temperature lowering capability is when there is remaining liquid spray fluid leaving the compressor (i.e. liquid spray fluid that has not been vaporized). Any such residual liquid spray fluid exiting the compressor possesses little or no capacity to provide work in the system and in some cases may further reduce the potential for optimized flow later in the cycle. The conversion of the liquid spray to vapor both reduces compressor temperature and increases the volumetric fluid flow at an effectively lower temperature.

In a preferred embodiment, the combination of temperature and pressure of the vapor leaving the compressor 502 is sufficient to maintain the spray fluid in a vapor form as it proceeds to the mixing chamber 504. If the temperature is too low and/or the pressure is too high relative to the mass flow rate of the spray, then a portion of the spray may undesirably remain in liquid state. Notably, some small portion of the liquid spray fluid that is not completely converted from liquid to vapor is considered acceptable for specific applications of the invention in some cases. Such liquid spray fluid may later vaporize in the mixer with the addition of heat from F1 leaving the boiler. Therefore in some cases, the small portion of un-vaporized fluid will not overly influence system performance.

The pressure and temperature of the heated working fluid mixture comprising first and second working fluids (and in some cases, spray fluid) leaving the mixing chamber 504 is controllable by many factors. These factors include expansion rate of the second expander 506, the mass flow rates of the first, second, and third working fluids, the mass flow rate of the spray fluid, and the quantity or rate of thermal energy provided to the first working fluid within boiler 510. Other factors include the percentage of useful work that is extracted form the first expander (if one is used) and the thermal energy that remains in the first working fluid, after exiting the first expander 508. It should be understood by individuals skilled in the art that these control settings can be adjusted during the operation of the cycle to maintain continuous operation. For example, these parameters can be controlled by selectively varying the pressure of the fluid mixture. The desired operational temperature within the cycle can be made by similar adjustments to mass flow rates and respective ratios thereof. As the input heat rate increases relative to the mass flow rates of the fluids, so does the operating temperature.

An additional means of controlling the temperature can be accomplished by allowing the temperature of the second working fluid entering the compressor 502 to increase. This is done by effectively keeping mass flow of the second working fluid fixed while allowing the temperature of the condenser to rise. Accomplishing a rise in condenser temperature is accomplished by decreasing the rate that energy is pumped to the thermal sink 516 by pump 514, or reducing the thermal energy consumed by the evaporator 1202 in FIG. 12. An alternative approach to increasing temperature of the second working fluid would be to increase the compression pressure of the compressor 502, without increasing the mass flow rate of the spray fluid, or conversely by fixing the flow rate of the second working fluid and lowering the mass flow rate of spray fluid. In addition to managing the temperature of the second working fluid as described above, temperatures and pressures can be managed within the condenser 512 by a broad range of approaches.

A wide variety of variations are possible with the present invention and all are intended to be included within the scope of the invention, provided that rejected heat from a first thermodynamic cycle is transported to a second thermodynamic cycle by direct mixing of working fluids which are used in each cycle.

The cycle described herein is an improvement over other cycles because it posses the inherent capacity to use larger quantities of the available source energy (i.e., heat energy) effectively and efficiently. There is no compromise to the integrity of basic thermodynamic principles or processes in the overall cycle configuration. In fact, each of the separate process steps described in the cycle herein represents a well understood thermodynamic process. The dynamics of each step can be traced to similar types of processes occurring independently in conventional systems. However, conventional systems do not combine process steps in the manner described herein, and therefore do not achieve the same results.

By creating computer models that represent both the details of each individual step, and as well the relationships across the boundaries between steps, it becomes possible to evaluate the cycle as a whole. The cycle advantageously involves utilization of available source energy at lower temperatures and re-use of normally rejected thermal energy by means of re-circulation. Accordingly, the computer models involve an evaluation process that incorporates iterative calculations within the performance simulations to account for the recycled energy. Such modeling and simulation has validated our unique method of using latent heat energy through appropriate placement of vapor state transitions. The resulting method and apparatus is capable of converting a greater portion of available thermal source energy to work than is currently understood to be possible using conventional means known today.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for producing work from heat in a continuous cycle, comprising:

pressurizing a first working fluid having a first chemical composition;

heating the first working fluid under pressure to obtain a first vapor comprised of the first working fluid;

compressing a second working fluid comprising a second vapor, the second working fluid have a second chemical composition different from the first chemical composition;

mixing said first vapor and said second vapor to form a third vapor;

transferring heat from said first vapor to said second vapor subsequent to said mixing;

expanding said third vapor to perform work;

cooling said third vapor to separate a condensate of said first vapor from said second vapor;

repeating said continuous cycle using said condensate recovered in said cooling step as said first working fluid, and said second vapor as said second working fluid; and controlling an operational dynamic of the continuous cycle by selectively varying at least one of a first mass flow rate of the first vapor and a second mass flow rate of the second vapor used in the mixing to dynamically vary a mixing ratio of the first and second vapor contained in the third vapor;

wherein said cooling step further comprises using said condensate as a refrigerant in an evaporator, and disposing said evaporator in an environment where it can absorb heat from a waste heat source.

2. The method according to claim 1, further comprising expanding the first vapor to perform work, prior to said mixing step.

3. The method according to claim 1, wherein said environment contains said third vapor, and said method further includes transferring heat from said third vapor to said condensate within said evaporator to cool the third vapor.

4. The method according to claim 1, wherein said environment is selected to facilitate a transfer of a rejected heat from said heating step, to said condensate.

5. The method according to claim 4, wherein said rejected heat is supplied from a return line of a geothermal well.

6. The method according to claim 1, further comprising, after said absorbing, using said condensate comprised of said first working fluid in said pressurizing step, whereby said cycle can be repeated.

7. The method according to claim 1, wherein at least a portion of said condensate is converted to as vapor within said evaporator.

8. The method according to claim 1, further comprising cooling said second working fluid by spraying a liquid into a flow of said second working fluid during said compressing, wherein said liquid is said first working fluid.

9. The method according to claim 1, wherein said mixing step further comprises variably adjusting the first mass flow rate and the second mass flow rate to vary an overall flow rate of the third vapor while varying the mixing ratio.

10. The method according to claim 1, further comprising adding heat to said third vapor from a source external to said cycle.

11. The method according to claim 1, wherein said mixing step further comprises mixing said first vapor at a same pressure as said second vapor.

12. The method according to claim 1, wherein at least a portion of said heat transferred from said first vapor to said second vapor comprises energy stored in said first vapor as a latent heat of vaporization.

13. The method according to claim 1, wherein said second vapor includes a portion of said first vapor after said separating step.

* * * * *